(12) United States Patent
Wang et al.

(10) Patent No.: US 9,930,534 B2
(45) Date of Patent: Mar. 27, 2018

(54) METHOD AND APPARATUS FOR DYNAMIC RESOURCE ADJUSTMENT BASED ON NETWORK SHARING

(71) Applicant: Huawei Technologies Co., Ltd., Shenzhen, Guangdong (CN)

(72) Inventors: Shuo Wang, Shanghai (CN); Yijun Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/331,439

(22) Filed: Oct. 21, 2016

(65) Prior Publication Data

US 2017/0041799 A1    Feb. 9, 2017

Related U.S. Application Data

(63) Continuation of application No. PCT/CN2014/076038, filed on Apr. 23, 2014.

(51) Int. Cl.
*H04W 74/00* (2009.01)
*H04W 72/00* (2009.01)
(Continued)

(52) U.S. Cl.
CPC ....... *H04W 16/02* (2013.01); *H04W 72/0493* (2013.01); *H04W 72/085* (2013.01);
(Continued)

(58) Field of Classification Search
CPC . H04W 16/02; H04W 48/18; H04W 72/0493; H04W 72/085; H04W 28/22;
(Continued)

(56) References Cited

U.S. PATENT DOCUMENTS

2011/0019624 A1* 1/2011 Lu .................. H04W 76/041
                                                      370/328
2011/0271117 A1* 11/2011 Qiang ............... H04L 63/164
                                                      713/181
(Continued)

FOREIGN PATENT DOCUMENTS

CN    101990250 A    3/2011
CN    103648088 A    3/2014
(Continued)

OTHER PUBLICATIONS

3GPP TS 36.321, V11.1.0, (Dec. 2012).*
(Continued)

*Primary Examiner* — William Nealon

(57) ABSTRACT

The present invention discloses a method, where the method includes: determining, by a management network element, a first P-GW to be re-allocated and adjustment type information of the first P-GW, and obtaining an identity of a PMNO corresponding to the first P-GW; obtaining, according to the obtained identity of the PMNO and a stored correspondence between an identity of a PMNO and a P-GW, resource information of a P-GW corresponding to the PMNO; and adjusting, according to the adjustment type information of the first P-GW and the resource information of the P-GW corresponding to the PMNO and based on that a sum of throughput upper limits of P-GWs corresponding to the PMNO is equal to a total throughput value of the PMNO, a throughput upper limit configured for the first P-GW and a throughput upper limit configured for another P-GW corresponding to the PMNO.

20 Claims, 10 Drawing Sheets

(51) Int. Cl.
*H04W 16/02* (2009.01)
*H04W 72/04* (2009.01)
*H04W 72/08* (2009.01)
  H04W 84/04 (2009.01)
  H04W 88/16 (2009.01)
  H04W 28/22 (2009.01)
  H04W 24/02 (2009.01)

(52) U.S. Cl.
CPC ............ *H04W 24/02* (2013.01); *H04W 28/22* (2013.01); *H04W 84/042* (2013.01); *H04W 88/16* (2013.01)

(58) Field of Classification Search
CPC ... H04W 28/26; H04W 48/17; H04W 84/042; H04W 88/16; H04W 24/02
USPC ...................................................... 455/452.1
See application file for complete search history.

(56) References Cited

U.S. PATENT DOCUMENTS

| | | | | |
|---|---|---|---|---|
| 2011/0280254 | A1* | 11/2011 | Shi | H04W 8/02 370/401 |
| 2012/0183701 | A1 | 7/2012 | Pilz et al. | |
| 2013/0163434 | A1* | 6/2013 | Hamel | H04W 60/06 370/237 |
| 2013/0230021 | A1 | 9/2013 | Zuniga et al. | |
| 2013/0301609 | A1 | 11/2013 | Smith et al. | |
| 2014/0003233 | A1* | 1/2014 | Rune | H04L 47/125 370/230 |
| 2014/0064188 | A1* | 3/2014 | D'Souza | H04W 88/16 370/328 |
| 2015/0139096 | A1* | 5/2015 | Morioka | H04W 28/08 370/329 |
| 2015/0156336 | A1* | 6/2015 | Tamura | H04W 48/18 455/406 |
| 2015/0304162 | A1* | 10/2015 | Wang | H04W 24/02 370/254 |

FOREIGN PATENT DOCUMENTS

| | | |
|---|---|---|
| EP | 1231010 A1 | 8/2002 |
| EP | 2317076 A2 | 5/2011 |
| RU | 2423019 C2 | 6/2011 |
| WO | 2011036087 A1 | 3/2011 |
| WO | 2012/142437 A1 | 10/2012 |
| WO | 2013/163745 A1 | 11/2013 |
| WO | 2014/003750 A1 | 1/2014 |

OTHER PUBLICATIONS

"3rd Generation Partnership Project; Technical Specification Group Services and System Aspects; Study on support of Broadband Forum (BBF) access Interworking (Release 12)", 3GPP TR 23.839 V12.0.0, Jun. 2013, 180 pages.

"3rd Generation Partnership Project; Technical Specification Group Services and System Aspects; Policy and charging control architecture (Release 12)", 3GPP TS 23.203 V12.4.0, Mar. 2014, 218 pages.

* cited by examiner

METHOD AND APPARATUS FOR DYNAMIC RESOURCE ADJUSTMENT BASED ON NETWORK SHARING

CROSS-REFERENCE TO RELATED APPLICATIONS

This application is a continuation of International Application No. PCT/CN2014/076038 filed on Apr. 23, 2014, the disclosure of which is hereby incorporated by reference in its entirety.

TECHNICAL FIELD

The present invention relates to the field of network communications technologies, and in particular, to a method and an apparatus for dynamic resource adjustment based on network sharing.

BACKGROUND

Network sharing refers to a technical means by which operators perform information exchange and resource sharing, that is, an operator allows another operator to share a network resource of the operator. An MVNO (mobile virtual network operator) refers to an operator that has no business license or develops in a limited scale and needs to develop its own users by using an existing basic MNO (mobile network operator) network, and provides a service to the users. To help better describe the present invention, in the present invention, an MVNO and an MNO that has a business license but develops its own users and provides a service by using a network of another corresponding MNO are collectively referred to as a PMNO (participant mobile network operator).

In a network sharing scenario, multiple PMNOs may share one P-GW (packet data network gateway), or one PMNO may be corresponding to multiple P-GWs in an MNO network. When one PMNO is corresponding to multiple P-GWs in the same MNO network, the PMNO sets a throughput upper limit for each corresponding P-GW. The throughput upper limit set for the P-GW is generally set according to a throughput that can be carried at a GBR (guaranteed bit rate). In addition, a sum of throughput upper limits set for the P-GWs corresponding to the PMNO is equal to a total throughput value subscribed in a PLMN (Public Land Mobile Network, public land mobile network) by the PMNO.

In the prior art, after a PMNO reaches, in a P-GW, a throughput upper limit set by the PMNO, the P-GW rejects a request that is sent by the PMNO and that causes an increase in a throughput. Therefore, when the remaining total throughput value of the PMNO does not yet reach the total subscribed throughput value, an event that a P-GW rejects a request sent by the PMNO and the request cannot access occurs, which undoubtedly causes blocking to a PMNO user's data service and compromises user experience while wasting a network resource and reducing utilization of a network resource.

SUMMARY

In view of this, the present invention provides a method and an apparatus for dynamic resource adjustment based on network sharing, to resolve problems of waste of a network resource and low utilization of a network resource existing during network resource allocation in the prior art. Specific solutions of the present invention are as follows:

According to an aspect of the present invention, the present invention provides a method for dynamic resource adjustment based on network sharing, including:

determining, by a management network element, a first P-GW to be re-allocated and adjustment type information of the first P-GW, and obtaining an identity of a PMNO corresponding to the first P-GW;

obtaining, by the management network element according to the obtained identity of the PMNO and a stored correspondence between an identity of a PMNO and a P-GW, resource information of a P-GW corresponding to the PMNO; and adjusting, by the management network element according to the adjustment type information of the first P-GW and the resource information of the P-GW corresponding to the PMNO and based on that a sum of throughput upper limits of P-GWs corresponding to the PMNO is equal to a total throughput value of the PMNO, a throughput upper limit configured for the first P-GW and a throughput upper limit configured for another P-GW corresponding to the PMNO, so as to satisfy a throughput required by the first P-GW.

Preferably, the determining, by a management network element, a first P-GW to be re-allocated and adjustment type information of the first P-GW, and obtaining an identity of a PMNO corresponding to the first P-GW includes:

receiving, by the management network element, a re-allocation request sent by the first P-GW, and determining that the first P-GW is to be re-allocated; and determining, by the management network element, the adjustment type information of the first P-GW and the identity of the PMNO according to the adjustment type information of the first P-GW and the identity of the PMNO corresponding to the first P-GW, where the adjustment type information and the identity are carried in the re-allocation request.

Preferably, the determining, by a management network element, a first P-GW to be re-allocated and adjustment type information of the first P-GW, and obtaining an identity of a PMNO corresponding to the first P-GW includes:

determining, by the management network element when determining that the first P-GW satisfies a preset condition, that the first P-GW is to be re-allocated, and determining the adjustment type information of the first P-GW; and obtaining, by the management network element according to the stored correspondence between an identity of a PMNO and a P-GW, the identity of the PMNO corresponding to the first P-GW.

Preferably, the determining, by the management network element when determining that the first P-GW satisfies a preset condition, that the first P-GW is to be re-allocated, and determining the adjustment type information of the first P-GW includes:

when determining that a ratio of a used throughput value in the first P-GW to the throughput upper limit is greater than a first preset value, determining, by the management network element, that the first P-GW is to be re-allocated and that the adjustment type information of the first P-GW is increasing the throughput upper limit configured for the first P-GW; or when determining that a ratio of a used throughput value in the first P-GW to the throughput upper limit is less than a second preset value, determining, by the management network element, that the first P-GW is to be re-allocated and that the adjustment type information of the first P-GW is decreasing the throughput upper limit configured for the first P-GW.

Preferably, when the re-allocation request further includes resource information of the first P-GW, the obtaining, by the management network element according to the obtained identity of the PMNO and a stored correspondence between an identity of a PMNO and a P-GW, resource information of a P-GW corresponding to the PMNO includes:

obtaining, by the management network element according to the identity of the PMNO, resource information of the another P-GW, except the first P-GW, corresponding to the PMNO.

Preferably, when the adjustment type information of the first P-GW is increasing the throughput upper limit in the first P-GW, the obtaining, by the management network element according to the obtained identity of the PMNO and a stored correspondence between an identity of a PMNO and a P-GW, resource information of a P-GW corresponding to the PMNO includes:

obtaining, by the management network element according to the obtained identity of the PMNO, the resource information of the P-GW corresponding to the PMNO; and when determining, according to the obtained resource information of the P-GW, that a remaining throughput value in at least one P-GW is not less than a third preset value, adjusting, according to the adjustment type information of the first P-GW and the resource information of the P-GW corresponding to the PMNO and based on that the sum of throughput upper limits of P-GWs corresponding to the PMNO is equal to the total throughput value of the PMNO, the throughput upper limit configured for the first P-GW and the throughput upper limit configured for the another P-GW corresponding to the PMNO; where the adjusting, according to the adjustment type information of the first P-GW and the resource information of the P-GW corresponding to the PMNO and based on that the sum of throughput upper limits of P-GWs corresponding to the PMNO is equal to the total throughput value of the PMNO, the throughput upper limit configured for the first P-GW and the throughput upper limit configured for the another P-GW corresponding to the PMNO specifically includes:

according to the adjustment type information of the first P-GW and resource information of the at least one P-GW, increasing, by the management network element, the throughput upper limit configured for the first P-GW, and correspondingly decreasing a throughput upper limit in the at least one P-GW.

Preferably, when the adjustment type information of the first P-GW is increasing the throughput upper limit in the first P-GW, the obtaining, by the management network element according to the obtained identity of the PMNO and a stored correspondence between an identity of a PMNO and a P-GW, resource information of a P-GW corresponding to the PMNO specifically includes:

obtaining, by the management network element according to the obtained identity of the PMNO, resource information of all the P-GWs corresponding to the PMNO; where the adjusting, according to the adjustment type information of the first P-GW and the resource information of the P-GW corresponding to the PMNO and based on that the sum of throughput upper limits of P-GWs corresponding to the PMNO is equal to the total throughput value of the PMNO, the throughput upper limit configured for the first P-GW and the throughput upper limit configured for the another P-GW corresponding to the PMNO specifically includes:

when determining, according to the resource information of all the P-GWs corresponding to the PMNO, that a used throughput value in all the P-GWs corresponding to the PMNO is not greater than a fourth preset value, according to the adjustment type information of the first P-GW and the resource information of all the P-GWs corresponding to the PMNO, increasing, by the management network element, the throughput upper limit configured for the first P-GW, and correspondingly decreasing the throughput upper limit in the another P-GW.

Preferably, the increasing the throughput upper limit configured for the first P-GW includes:

increasing, by the management network element, a preset throughput value to the throughput upper limit configured for the first P-GW; or when the re-allocation request includes a total throughput value required by the first P-GW, increasing, by the management network element according to the total throughput value required by the first P-GW, the throughput upper limit in the first P-GW to the total throughput value required by the first P-GW, where the total throughput value required by the first P-GW is obtained by the first P-GW in advance by means of estimation.

Preferably, when the adjustment type information of the first P-GW is decreasing the throughput upper limit in the first P-GW, the adjusting, by the management network element according to the adjustment type information of the first P-GW and the resource information of the P-GW corresponding to the PMNO and based on that a sum of throughput upper limits of P-GWs corresponding to the PMNO is equal to a total throughput value of the PMNO, a throughput upper limit configured for the first P-GW and a throughput upper limit configured for another P-GW corresponding to the PMNO includes:

decreasing, by the management network element, the throughput upper limit configured for the first P-GW, ensuring that a throughput upper limit in the first P-GW after the throughput upper limit is decreased satisfies the throughput required by the first P-GW, and correspondingly increasing the throughput upper limit configured for the another P-GW.

Preferably, the decreasing, by the management network element, the throughput upper limit configured for the first P-GW includes:

decreasing, by the management network element, a preset throughput value to the throughput upper limit configured for the first P-GW; or decreasing, by the management network element, the throughput upper limit in the first P-GW to the used throughput value in the first P-GW according to the used throughput value in the first P-GW.

Preferably, the decreasing, by the management network element, the throughput upper limit configured for the first P-GW includes:

decreasing, by the management network element according to a change history record of the throughput upper limit configured for the first P-GW, the throughput upper limit configured for the first P-GW to an original preset value of the throughput upper limit configured for the first P-GW.

Preferably, before the decreasing the throughput upper limit configured for the first P-GW to an original preset value of the throughput upper limit configured for the first P-GW, the method further includes:

determining, by the management network element according to the change history record of the throughput upper limit in the first P-GW, whether the original preset value of the throughput upper limit in the first P-GW is not less than the used throughput value in the first P-GW; and when determining that the original preset value of the throughput upper limit in the first P-GW is not less than the used throughput value in the first P-GW, decreasing, by the management network element, the throughput upper limit configured for the first P-GW to the original preset value of the throughput upper limit configured for the first P-GW.

Preferably, the management network element includes a policy and charging rules function PCRF or a service platform Service Platform.

According to another aspect of the present invention, the present invention provides a method for dynamic resource adjustment based on network sharing, including:

receiving, by a first P-GW, an IP-connectivity access network IP-CAN session modification request;

determining adjustment type information of the first P-GW when the first P-GW determines, according to the IP-CAN session modification request, that the IP-CAN session modification request causes a change in a total throughput value that is of a PMNO corresponding to the first P-GW and is in the first P-GW, and that a total throughput value in the first P-GW satisfies a preset condition; and initiating, by the first P-GW to a management network element, a re-allocation request that includes the adjustment type information of the first P-GW and an identity of the PMNO corresponding to the first P-GW, so that after receiving the re-allocation request, the management network element adjusts, according to the re-allocation request, a throughput upper limit configured for the first P-GW and a throughput upper limit configured for another P-GW corresponding to the PMNO, so as to satisfy a throughput required by the first P-GW.

Preferably, the determining, by the first P-GW according to the IP-CAN session modification request, that the IP-CAN session modification request causes a change in a total throughput value that is of a PMNO corresponding to the first P-GW and is in the first P-GW, and that a total throughput value in the first P-GW satisfies a preset condition includes:

when the IP-CAN session modification request is a request for increasing the throughput upper limit in the first P-GW, and a used throughput value in the first P-GW is greater than a first preset threshold, determining that the first P-GW satisfies the preset condition; or when the IP-CAN session modification request is a request for decreasing the throughput upper limit in the first P-GW, and a used throughput value in the first P-GW is less than a second preset threshold, determining that the first P-GW satisfies the preset condition.

Preferably, the request for increasing the throughput upper limit in the first P-GW includes any one of a dedicated bearer setup request, a dedicated bearer activation request, or a dedicated bearer update request; and the request for decreasing the throughput upper limit in the first P-GW includes a dedicated bearer deletion request or a dedicated bearer update request.

Preferably, the determining adjustment type information of the first P-GW includes:

when the IP-CAN session modification request is a request for increasing the throughput upper limit in the first P-GW, determining that the adjustment type information of the first P-GW is increasing the throughput upper limit in the first P-GW; or when the IP-CAN session modification request is a request for decreasing the throughput upper limit in the first P-GW, determining that the adjustment type information of the first P-GW is decreasing the throughput upper limit in the first P-GW.

Preferably, the receiving, by a first P-GW, an IP-CAN session modification request specifically includes: receiving, by the first P-GW, an IP-CAN session modification request sent by user equipment UE, a mobility management entity MME, or a policy and charging rules function PCRF.

According to still another aspect of the present invention, the present invention provides an apparatus for dynamic resource adjustment based on network sharing, including:

a determining module, configured to: determine a first P-GW to be re-allocated and adjustment type information of the first P-GW, and obtaining an identity of a PMNO corresponding to the first P-GW;

an obtaining module, configured to obtain, according to the identity that is of the PMNO and is obtained by the determining module and a stored correspondence between an identity of a PMNO and a P-GW, resource information of a P-GW corresponding to the PMNO; and an adjustment module, configured to adjust, according to the adjustment type information that is of the first P-GW and is determined by the determining module and the resource information that is of the P-GW corresponding to the PMNO and is obtained by the obtaining module, and based on that a sum of throughput upper limits of P-GWs corresponding to the PMNO is equal to a total throughput value of the PMNO, a throughput upper limit configured for the first P-GW and a throughput upper limit configured for another P-GW corresponding to the PMNO, so as to satisfy a throughput required by the first P-GW.

Preferably, the apparatus further includes:

a re-allocation request receiving module, configured to receive a re-allocation request sent by the first P-GW; where the determining module is specifically configured to: when the re-allocation request receiving module receives the re-allocation request sent by the first P-GW, determine that the first P-GW is to be re-allocated; and determine the adjustment type information of the first P-GW and the identity of the PMNO according to the adjustment type information of the first P-GW and the identity of the PMNO corresponding to the first P-GW, where the adjustment type information and the identity are carried in the re-allocation request.

Preferably, the determining module is further configured to determine whether the first P-GW satisfies a preset condition; and when determining that the first P-GW satisfies the preset condition, the determining module determines that the first P-GW is to be re-allocated; determines the adjustment type information of the first P-GW; and obtains, according to the stored correspondence between an identity of a PMNO and a P-GW, the identity of the PMNO corresponding to the first P-GW.

Preferably, the apparatus further includes:

a first judging module, configured to: determine whether a ratio of a used throughput value in the first P-GW to the throughput upper limit is greater than a first preset value, and/or determine whether the ratio of the used throughput value in the first P-GW to the throughput upper limit is less than a second preset value; where that the determining module determines that the first P-GW satisfies the preset condition specifically includes:

when the first judging module determines that the ratio of the used throughput value in the first P-GW to the throughput upper limit is greater than the first preset value, the determining module determines that the first P-GW is to be re-allocated, and that the adjustment type information of the first P-GW is increasing the throughput upper limit configured for the first P-GW; or when the first judging module determines that the ratio of the used throughput value in the first P-GW to the throughput upper limit is less than the second preset value, the determining module determines that the first P-GW is to be re-allocated, and that the adjustment type information of the first P-GW is decreasing the throughput upper limit configured for the first P-GW.

Preferably, when the re-allocation request further includes resource information of the first P-GW, the obtaining module is specifically configured to obtain, according to the identity of the PMNO, resource information of the another P-GW, except the first P-GW, corresponding to the PMNO.

Preferably, when the adjustment type information of the first P-GW is increasing the throughput upper limit in the first P-GW, the obtaining module is specifically configured to obtain, according to the identity that is of the PMNO and is obtained by the determining module, the resource information of the P-GW corresponding to the PMNO; and the apparatus further includes:

a first determining submodule, configured to determine, according to the resource information that is of the P-GW and is obtained by the obtaining module, that a remaining throughput value in at least one P-GW is not less than a third preset value; where in this case, the adjustment module is specifically configured to: according to the adjustment type information of the first P-GW and resource information of the at least one P-GW, increase the throughput upper limit configured for the first P-GW, and correspondingly decrease a throughput upper limit in the at least one P-GW.

Preferably, when the adjustment type information of the first P-GW is increasing the throughput upper limit in the first P-GW, the obtaining module is specifically configured to obtain, according to the identity that is of the PMNO and is obtained by the determining module, resource information of all the P-GWs corresponding to the PMNO; and the apparatus further includes:

a second determining submodule, configured to determine, according to the resource information that is of all the P-GWs corresponding to the PMNO and is obtained by the obtaining module, that a used throughput value in all the P-GWs corresponding to the PMNO is not greater than a fourth preset value; where in this case, the adjustment module is specifically configured to: according to the adjustment type information of the first P-GW and the resource information of all the P-GWs corresponding to the PMNO, increase the throughput upper limit configured for the first P-GW, and correspondingly decrease the throughput upper limit in the another P-GW.

Preferably, the adjustment module is specifically configured to: increase a preset throughput value to the throughput upper limit configured for the first P-GW; or when the re-allocation request includes a total throughput value required by the first P-GW, increase, according to the total throughput value required by the first P-GW, the throughput upper limit in the first P-GW to the total throughput value required by the first P-GW, where the total throughput value required by the first P-GW is obtained by the first P-GW in advance by means of estimation.

Preferably, when the adjustment type information of the first P-GW is decreasing the throughput upper limit in the first P-GW, the adjustment module is specifically configured to: decrease the throughput upper limit configured for the first P-GW, ensure that a throughput upper limit in the first P-GW after the throughput upper limit is decreased satisfies the throughput required by the first P-GW, and correspondingly increase the throughput upper limit configured for the another P-GW.

Preferably, the adjustment module is specifically configured to: decrease a preset throughput value to the throughput upper limit configured for the first P-GW, or decrease the throughput upper limit in the first P-GW to the used throughput value in the first P-GW according to the used throughput value in the first P-GW.

Preferably, the adjustment module is specifically configured to decrease, according to a change history record of the throughput upper limit configured for the first P-GW, the throughput upper limit configured for the first P-GW to an original preset value of the throughput upper limit configured for the first P-GW.

Preferably, the apparatus further includes:

a second judging module, configured to determine, according to the change history record of the throughput upper limit in the first P-GW, whether the original preset value of the throughput upper limit in the first P-GW is not less than the used throughput value in the first P-GW; where the adjustment module is specifically configured to: when the second judging module determines that the original preset value of the throughput upper limit in the first P-GW is not less than the used throughput value in the first P-GW, decrease the throughput upper limit configured for the first P-GW to the original preset value of the throughput upper limit configured for the first P-GW.

Based on yet another aspect of the present invention, the present invention further provides an apparatus for dynamic resource adjustment based on network sharing, including:

a receiving module, configured to receive an IP-connectivity access network IP-CAN session modification request;

an information determining module, configured to determine adjustment type information of the first P-GW when determining, according to the IP-CAN session modification request received by the receiving module, that the IP-CAN session modification request causes a change in a total throughput value that is of a PMNO corresponding to the first P-GW and is in the first P-GW, and that a total throughput value in the first P-GW satisfies a preset condition; and a re-allocation request sending module, configured to initiate, to a management network element, a re-allocation request that includes the adjustment type information of the first P-GW and an identity of the PMNO corresponding to the first P-GW, so that after receiving the re-allocation request, the management network element adjusts, according to the re-allocation request, a throughput upper limit configured for the first P-GW and a throughput upper limit configured for another P-GW corresponding to the PMNO, so as to satisfy a throughput required by the first P-GW.

Preferably, the information determining module is specifically configured to: when the IP-CAN session modification request is a request for increasing the throughput upper limit in the first P-GW, and a used throughput value in the first P-GW is greater than a first preset threshold, determine that the first P-GW satisfies the preset condition; or the information determining module is specifically configured to: when the IP-CAN session modification request is a request for decreasing the throughput upper limit in the first P-GW, and a used throughput value in the first P-GW is less than a second preset threshold, determine that the first P-GW satisfies the preset condition.

Preferably, the request for increasing the throughput upper limit in the first P-GW includes any one of a dedicated bearer setup request, a dedicated bearer activation request, or a dedicated bearer update request; and the request for decreasing the throughput upper limit in the first P-GW includes a dedicated bearer deletion request or a dedicated bearer update request.

Preferably, the information determining module is specifically configured to: when the IP-CAN session modification request is a request for increasing the throughput upper limit in the first P-GW, determine that the adjustment type information of the first P-GW is increasing the throughput upper limit in the first P-GW; or when the IP-CAN session modification request is a request for decreasing the throughput upper limit in the first P-GW, determine that the adjustment type information of the first P-GW is decreasing the throughput upper limit in the first P-GW.

Preferably, the receiving module is specifically configured to receive an IP-CAN session modification request sent by user equipment UE, a mobility management entity MME, or a policy and charging rules function PCRF.

It can be learned from the foregoing technical solutions that, a management network element determines a first P-GW to be re-allocated and adjustment type information of the first P-GW, and obtains an identity of a PMNO corresponding to the first P-GW; further obtains, according to the obtained identity of the PMNO and a stored correspondence between an identity of a PMNO and a P-GW, resource information of a P-GW corresponding to the PMNO; and finally adjusts, according to the adjustment type information of the first P-GW and the resource information of the P-GW corresponding to the PMNO and based on that a sum of throughput upper limits of P-GWs corresponding to the PMNO is equal to a total throughput value of the PMNO, a throughput upper limit configured for the first P-GW and a throughput upper limit configured for another P-GW corresponding to the PMNO, so as to satisfy a throughput required by the first P-GW. Therefore, when a remaining total throughput value of the PMNO does not yet reach a total subscribed throughput value, after a P-GW receives a request that is sent by the PMNO and that causes an increase in a throughput value, the management network element re-allocates the throughput upper limits of the P-GWs corresponding to the PMNO, so that a throughput upper limit of the P-GW is sufficient to provide an increased throughput value caused by the request sent by the PMNO, which saves a network resource, increases utilization of a network resource, and improves user experience.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
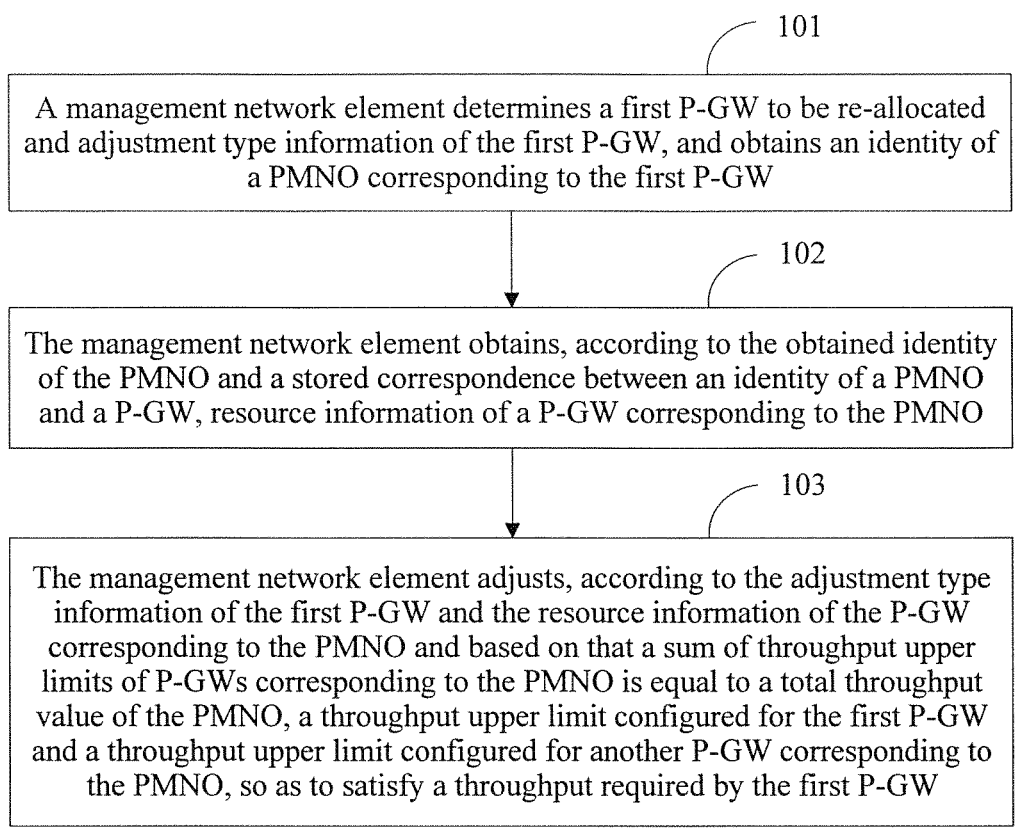
FIG. 1 is a flowchart of a method for dynamic resource adjustment based on network sharing according to the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

With prosperous development of a telecommunications market, network sharing provides a new operation mode for a network operator. In the prior art, one MNO (mobile network operator) network may serve multiple PMNOs (participant mobile network operator). In this case, the MNO needs to perform network resource management well for different PMNOs; for example, allocate different radio access resources, maximum user quantities, maximum bearer/packet data protocol resources, available services (such as a short message service and a positioning service), and the like, to the different PMNOs.

In a network sharing scenario, multiple PMNOs may share one P-GW (packet data network gateway), or one PMNO may be corresponding to multiple P-GWs in an MNO network. When one PMNO is corresponding to multiple P-GWs in the same MNO network, the MNO needs to set a throughput upper limit for each P-GW. Generally, the throughput upper limit of the P-GW is set according to a throughput upper limit carried at a GBR (guaranteed bit rate) in the P-GW, and the PMNO grants a corresponding throughput capability to each P-GW by using a software use scope licensing license. In actual application, a PMNO subscribes a total throughput value in advance in a PLMN (Public Land Mobile Network, public land mobile network), that is, a maximum throughput capability that can be carried by the PMNO. Therefore, a sum of throughput upper limits set for the P-GWs corresponding to the PMNO is equal to the total throughput value subscribed in the PLMN by the PMNO.

However, after studying the prior art, the applicant finds that when the PMNO reaches, in a P-GW, a throughput upper limit set by the PMNO, the P-GW rejects a request that is sent by the PMNO and that causes an increase in a throughput value. Therefore, when all the multiple P-GWs corresponding to the PMNO have few remaining throughput capabilities, and a remaining total throughput value of the PMNO does not yet reach a total subscribed throughput value, and when a P-GW receives a request that is sent by the PMNO and that causes an increase in a throughput value, although the remaining total throughput value of the PMNO is sufficient to provide an increased throughput value caused by the request sent by the PMNO, the P-GW rejects the request sent by the PMNO because a remaining throughput value of the P-GW is not sufficient to provide the increased throughput value caused by the request sent by the PMNO, which undoubtedly causes blocking to a PMNO user's data service and compromises user experience while wasting a network resource and reducing utilization of a network resource.

Based on this, the present invention provides a method for dynamic resource adjustment based on network sharing, which is applied to a management network element. The management network element is configured to configure a total throughput value of a PMNO and throughput upper limits of P-GWs corresponding to the PMNO. A sum of the throughput upper limits of the P-GWs is equal to the total throughput value of the PMNO. Referring to FIG. 1, FIG. 1 shows a flowchart of a method for dynamic resource adjustment based on network sharing according to the present invention. The method may include the following steps:

Step 101: A management network element determines a first P-GW to be re-allocated and adjustment type information of the first P-GW, and obtains an identity of a PMNO corresponding to the first P-GW.

The management network element includes a policy and charging rules function PCRF or a service platform Service Platform.

In the present invention, one PMNO may be corresponding to multiple P-GWs, or one P-GW may be corresponding to multiple PMNOs. To differentiate the PMNOs corresponding to the same PGW, the management network element needs to obtain identities of the PMNOs corresponding to the P-GW, and implements differentiation of the PMNOs by using the identities of the PMNOs. In this embodiment, there may be the following implementation manners of determining, by the management network element, the first P-GW to be re-allocated:

Manner 1: The management network element receives a re-allocation request sent by the first P-GW, and in this case, the management network element determines that the first P-GW that sends the re-allocation request is to be re-allocated.

In this embodiment, the re-allocation request sent by the first P-GW to the management network element carries the adjustment type information of the first P-GW and the identity of the PMNO corresponding to the first P-GW, so that the management network element determines the adjustment type information of the first P-GW and the identity of the PMNO according to adjustment type information of the first P-GW and the identity of the PMNO corresponding to the first P-GW, where the adjustment type information and the identity are carried in the re-allocation request.

The adjustment type information may include information of increasing a throughput upper limit or information of decreasing a throughput upper limit.

In this embodiment, when the first P-GW needs to change a throughput upper limit preconfigured by the first P-GW, the first P-GW sends the re-allocation request to the management network element. The re-allocation request is used to request the management network element to re-allocate a throughput upper limit of the first P-GW. Further, after receiving the re-allocation request, the management network element performs corresponding processing, and finally completes increasing or decreasing the throughput upper limit configured for the first P-GW.

Manner 2: When determining that the first P-GW satisfies a preset condition, the management network element determines that the first P-GW is to be re-allocated.

In this embodiment, the management network element may monitor periodically or in real time a throughput use status in the P-GW. The preset condition may include whether a ratio of a used throughput value in the first P-GW to a throughput upper limit is greater than a first preset value, or whether a ratio of a used throughput value in the first P-GW to a throughput upper limit is less than a second preset value.

Specifically, when determining that the ratio of the used throughput value in the first P-GW to the throughput upper limit is greater than the first preset value, the management network element determines that the first P-GW is to be re-allocated, and that the adjustment type information of the first P-GW is increasing the throughput upper limit configured for the first P-GW. When determining that the ratio of the used throughput value in the first P-GW to the throughput upper limit is less than the second preset value, the management network element determines that the first P-GW is to be re-allocated, and that the adjustment type information of the first P-GW is decreasing the throughput upper limit configured for the first P-GW. In actual application, the first preset value may be a value such as 90% or 95% that indicates an almost saturated state of the first P-GW. The second preset value may be a value such as 10% or 5% that indicates an almost idle state of the first P-GW. Certainly, the first preset value and the second preset value may be set manually according to an actual requirement.

When determining that the first P-GW satisfies the preset condition, the management network element determines that the first P-GW is to be re-allocated, and further determines the adjustment type information of the first P-GW. In addition, the management network element obtains, according to a stored correspondence between an identity of a PMNO and a P-GW, the identity of the PMNO corresponding to the first P-GW.

Step 102: The management network element obtains, according to the obtained identity of the PMNO and a stored correspondence between an identity of a PMNO and a P-GW, resource information of a P-GW corresponding to the PMNO.

The resource information of the P-GW may include a throughput upper limit configured for the P-GW and a currently used throughput value in the P-GW.

In this embodiment, after obtaining the identity of the PMNO and the stored correspondence between an identity of a PMNO and a P-GW, the management network element further obtains, according to the identity of the PMNO and the stored correspondence between an identity of a PMNO and a P-GW, the resource information of the P-GW corresponding to the PMNO.

For example, it is assumed that the PMNO is corresponding to four P-GWs, namely the first P-GW, a second P-GW, a third P-GW, and a fourth P-GW. When the management network element determines that the first P-GW is to be re-allocated, after obtaining resource information of the first P-GW, the management network element continues to search for the second P-GW, the third P-GW, and the fourth P-GW that are corresponding to the PMNO, and obtains resource information of the second P-GW, the third P-GW, and the fourth P-GW, so as to learn resource information of another P-GW in the PMNO corresponding to the currently determined first P-GW to be re-allocated.

Step 103: The management network element adjusts, according to the adjustment type information of the first P-GW and the resource information of the P-GW corresponding to the PMNO and based on that a sum of throughput upper limits of P-GWs corresponding to the PMNO is equal to a total throughput value of the PMNO, a throughput upper limit configured for the first P-GW and a throughput upper limit configured for another P-GW corresponding to the PMNO, so as to satisfy a throughput required by the first P-GW.

In this embodiment, the adjustment type information of the first P-GW may include increasing the throughput upper limit in the first P-GW or decreasing the throughput upper limit in the first P-GW. When the adjustment type information of the first P-GW is increasing the throughput upper limit in the first P-GW, the throughput upper limit configured for the first P-GW is increased, so that the first P-GW after the throughput upper limit is increased satisfies the throughput required by the first P-GW; at the same time, the throughput upper limit configured for the another P-GW is correspondingly decreased according to resource information of the another P-GW corresponding to the PMNO. When the adjustment type information of the first P-GW is decreasing the throughput upper limit in the first P-GW, the throughput upper limit configured for the first P-GW is decreased, and it is ensured that the first P-GW after the throughput upper limit is decreased still satisfies the throughput required by the first P-GW; at the same time, the throughput upper limit configured for the another P-GW is correspondingly increased according to the resource information of the another P-GW corresponding to the PMNO.

It should be noted that, because the sum of the throughput upper limits of the P-GWs corresponding to the PMNO is equal to the total throughput value of the PMNO, when the throughput upper limits of the P-GWs corresponding to the PMNO are adjusted, it should be ensured that an increased throughput upper limit of the first P-GW is equal to a decreased throughput upper limit of the another P-GW, or a decreased throughput upper limit of the first P-GW is equal to an increased throughput upper limit of the another P-GW.

It should be noted that, to avoid frequently adjusting the throughput upper limit of first P-GW, it should be ensured that the management network element in the present invention adjusts the throughput upper limit of the first P-GW to a maximum extent, so that the throughput required by the first P-GW is satisfied after only one adjustment.

In addition, on the basis of the foregoing embodiment, in an implementation process of Manner 1, the re-allocation request may further include the resource information of the first P-GW.

In the present invention, when sending the re-allocation request to the management network element, the first P-GW first detects the resource information of the first P-GW, and sends the resource information of the first P-GW to the management network element. The resource information of the first P-GW may include the throughput upper limit configured for the first P-GW and usage information that indicates a current use status of the first P-GW. In this case, step 102 may further specifically include step 1021: The management network element obtains, according to the identity of the PMNO, resource information of the another P-GW, except the first P-GW, corresponding to the PMNO.

In this embodiment, when the management network element obtains, according to the identity of the PMNO and the stored correspondence between an identity of a PMNO and a P-GW, the P-GW corresponding to the PMNO, because the first P-GW has sent the current resource information of the first P-GW to the management network element, the management network element only needs to obtain the resource information of the another P-GW, except the first P-GW, corresponding to the PMNO.

It should be noted that, in this embodiment, the throughput required by the first P-GW may be understood as a throughput upper limit to which a request received by the first P-GW causes the throughput upper limit configured for the first P-GW to be adjusted, which may specifically be a throughput upper limit to which the first P-GW needs to be currently adjusted. For example, a throughput upper limit preconfigured for the first P-GW is 100, and a used throughput value of the first P-GW is 89. In this case, when the first P-GW receives a request that causes the throughput value to increase by 20, a total throughput capability in the first P-GW is 109, that is, the throughput required by the first P-GW is 109.

Certainly, in actual application, when the first P-GW receives a request sent by a first PMNO, the first P-GW responds to the request in a gradual process, and the first P-GW cannot accurately and immediately learn a specific throughput upper limit required by the first P-GW after receiving the request. Therefore, to ensure that the throughput upper limit in the first P-GW is well adjusted at a time and avoid a case in which the first P-GW still cannot receive the request after the throughput upper limit in the first P-GW is adjusted, the management network element should increase the throughput upper limit of the first P-GW to a maximum extent. The foregoing case is still used as an example for description, if the used throughput value of the first P-GW is 89, and the first P-GW receives the request that causes the throughput value to increase by 20, the throughput required by the first P-GW is re-allocated to 120, so as to ensure that the first P-GW satisfies the throughput required by the first P-GW after the throughput upper limit is increased at a time, so that the first P-GW successfully receives the request that causes an increases in a throughput value.

According to the foregoing technical solution of the present invention, a management network element determines a first P-GW to be re-allocated and adjustment type information of the first P-GW, and obtains an identity of a PMNO corresponding to the first P-GW; further obtains, according to the obtained identity of the PMNO and a stored correspondence between an identity of a PMNO and a P-GW, resource information of a P-GW corresponding to the PMNO; and finally adjusts, according to the adjustment type information of the first P-GW and the resource information of the P-GW corresponding to the PMNO and based on that a sum of throughput upper limits of P-GWs corresponding to the PMNO is equal to a total throughput value of the PMNO, a throughput upper limit configured for the first P-GW and a throughput upper limit configured for another P-GW corresponding to the PMNO, so as to satisfy a throughput required by the first P-GW. Therefore, when a remaining total throughput value of the PMNO does not yet reach a total subscribed throughput value, after a P-GW receives a request that is sent by the PMNO and that causes an increase in a throughput value, the management network element re-allocates the throughput upper limits of the P-GWs corresponding to the PMNO, so that a throughput upper limit of the P-GW is sufficient to provide an increased throughput value caused by the request sent by the PMNO, which saves a network resource, increases utilization of a network resource, and improves user experience.

In addition, according to the present invention, the management network element can actively re-allocate the throughput upper limit configured for the first P-GW that does not have sufficient throughput capabilities, so as to ensure that when the first P-GW receives, in a subsequent process, a request that causes an increases in a throughput value, the first P-GW can successfully receive the request, which further increases utilization of a network resource.

To help better describe the present invention, the applicant makes a further description by giving examples.

Case 1: The adjustment type information of the first P-GW is increasing the throughput upper limit in the first P-GW.

Figure 2:
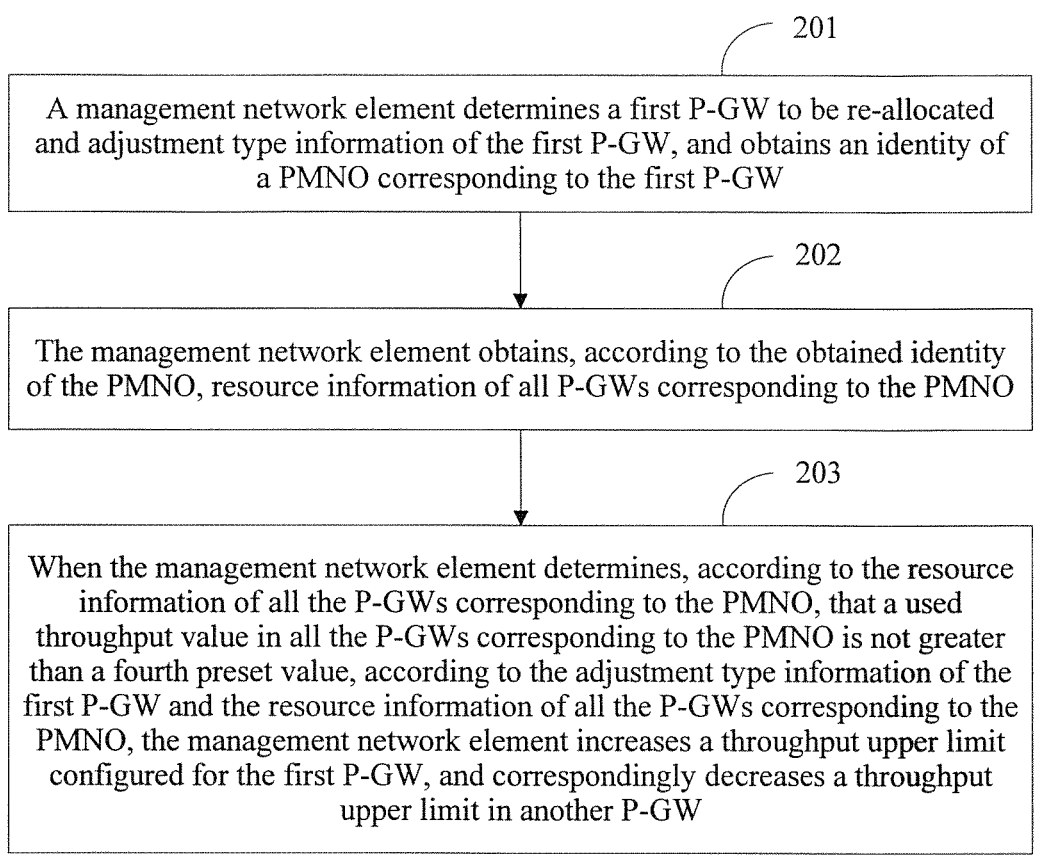
FIG. 2 is another flowchart of a method for dynamic resource adjustment based on network sharing according to the present invention.

Referring to FIG. 2, FIG. 2 shows another flowchart of a method for dynamic resource adjustment based on network sharing according to the present invention, where the method includes the following steps:

Step 201: A management network element determines a first P-GW to be re-allocated and adjustment type information of the first P-GW, and obtains an identity of a PMNO corresponding to the first P-GW.

In this embodiment, when the first P-GW receives a request that causes an increase in a throughput value, such as a dedicated bearer setup request, a dedicated bearer activation request, or a dedicated bearer update request, and a current remaining throughput value of the first P-GW is not sufficient to provide an increased throughput value caused by the request, the first P-GW sends, to the management network element, a re-allocation request that includes the adjustment type information of increasing a throughput upper limit in the first P-GW and the identity of the PMNO corresponding to the first P-GW. After receiving the re-allocation request sent by the first P-GW, the management network element determines that the first P-GW is to be re-allocated.

Alternatively, when determining that a ratio of a used throughput value in the first P-GW to the throughput upper limit is greater than a first preset value, the management network element determines that the first P-GW is to be re-allocated, and that the adjustment type information of the first P-GW is increasing the throughput upper limit in the first P-GW. In addition, the management network element obtains, according to a stored correspondence between an identity of a PMNO and a P-GW, the identity of the PMNO corresponding to the first P-GW.

Step 202: The management network element obtains, according to the obtained identity of the PMNO, resource information of all P-GWs corresponding to the PMNO.

In this embodiment, the management network element first obtains, according to the obtained identity of the PMNO, all the P-GWs corresponding to the PMNO, and further obtains the resource information of all the P-GWs corresponding to the PMNO.

The resource information of all the P-GWs includes current throughput upper limits in the P-GWs, and usage information that indicates current use statuses of all the P-GWs.

In this embodiment, it is assumed that the PMNO is corresponding to three P-GWs, namely the first P-GW, a second P-GW, and a third P-GW. In this case, the management network element separately obtains current resource information of the first P-GW, the second P-GW, and the third P-GW, which includes throughput upper limits preconfigured for the first P-GW, the second P-GW, and the third P-GW, such as 100, 120, and 150. The management network element further obtains currently used throughput values respectively in the first P-GW, the second P-GW, and the third P-GW, such as 60, 60, and 60. Therefore, the management network element learns that remaining throughput values in the first P-GW, the second P-GW, and the third P-GW are respectively 40, 60, and 90.

Certainly, referring to the foregoing embodiment of the present invention, the first P-GW may further directly send the current resource information of the first P-GW to the management network element, and in this case, the management network element only needs to further obtain resource information of the second P-GW and the third P-GW, so that the management network element obtains the resource information of all the P-GWs corresponding to the PMNO.

Step 203: When the management network element determines, according to the resource information of all the P-GWs corresponding to the PMNO, that a used throughput value in all the P-GWs corresponding to the PMNO is not greater than a fourth preset value, according to the adjustment type information of the first P-GW and the resource information of all the P-GWs corresponding to the PMNO, the management network element increases a throughput upper limit configured for the first P-GW, and correspondingly decreases a throughput upper limit in another P-GW.

The fourth preset value may be a value indicating that the PMNO currently has many remaining throughput capabilities. For example, the fourth preset value is set to 200, and when a sum of the currently used throughput values respectively in the first P-GW, the second P-GW, and the third P-GW is 180, which is not greater than 200, it indicates that the PMNO currently has many remaining throughput capabilities, and the first P-GW may be re-allocated.

Specifically, in this embodiment, the management network element may learn, according to the resource information of all the P-GWs corresponding to the PMNO, that a total throughput value subscribed by the PMNO is 100+120+150=370, that is, learn that a current remaining throughput value of the PMNO is 190.

Different requests received by the first P-GW cause an increase of different throughput values. Further, it is assumed that a throughput upper limit preconfigured for the first P-GW is 100, a currently used throughput value is 60, and an increased throughput value caused by a request received by the first P-GW is 60. In this case, a throughput capacity currently required by the first P-GW is 120 in theory. According to a processing procedure in the prior art, if after receiving the request that causes an increased throughput value 60, the first P-GW finds that the first P-GW does not have a sufficient capability to receive the request, the first P-GW rejects the request. However, in the present invention, the management network element first determines, according to the resource information of all the P-GWs corresponding to the PMNO, that the used throughput value 180 in all the P-GWs corresponding to the PMNO is not greater than the fourth preset value 200, according to the adjustment type information of the first P-GW and the resource information of all the P-GWs corresponding to the PMNO, further increases the throughput upper limit configured for the first P-GW, and correspondingly decreases the throughput upper limit in the another P-GW.

In this embodiment, after the management network element determines that the used throughput value in all the P-GWs corresponding to the PMNO is not greater than the fourth preset value, the management network element increases the throughput upper limit in the first P-GW, so that a throughput upper limit in the first P-GW after the throughput upper limit is increased satisfies the throughput currently required by the first P-GW. In addition, because the total throughput value subscribed by the PMNO is fixed, the management network element correspondingly decreases the throughput upper limit in the another P-GW when increasing the throughput upper limit in the first P-GW. A sum of values by which the throughput upper limit is correspondingly decreased in other P-GWs is equal to a value by which the throughput upper limit is increased in the first P-GW. In this embodiment, that is, the throughput upper limit in the first P-GW is increased from 100 to 120, and an increased throughput value is 20. Then, when the management network element re-allocates a throughput upper limit/limits in the second P-GW and/or the third P-GW, a sum of a value/values by which the throughput upper limit/limits is decreased in the second P-GW and/or the third P-GW is also 20.

It should be noted that, an implementation manner of decreasing the throughput upper limit/limits in the second P-GW and/or the third P-GW is not limited in the present invention. According to the present invention, the management network element may correspondingly decrease the throughput upper limit in only the second P-GW, or may correspondingly decrease the throughput upper limit in only the third P-GW, or may decrease the throughput upper limits in both the second P-GW and the third P-GW.

It should further be noted that, in this embodiment, the throughput 120 currently required by the first P-GW is a theoretical value. However, in actual application, the first P-GW cannot accurately and immediately learn the fact that the throughput required by the first P-GW is 120. Therefore, in actual application, when re-allocating the throughput upper limit of the first P-GW corresponding to the PMNO, the management network element considers by default that the throughput currently required by the first P-GW is 150, and performs re-allocation with a total throughput capability value currently required by the first P-GW being 150. A specific re-allocation process of the first P-GW is the same as the foregoing implementation process, and the inventor provides no further details herein.

Figure 3:
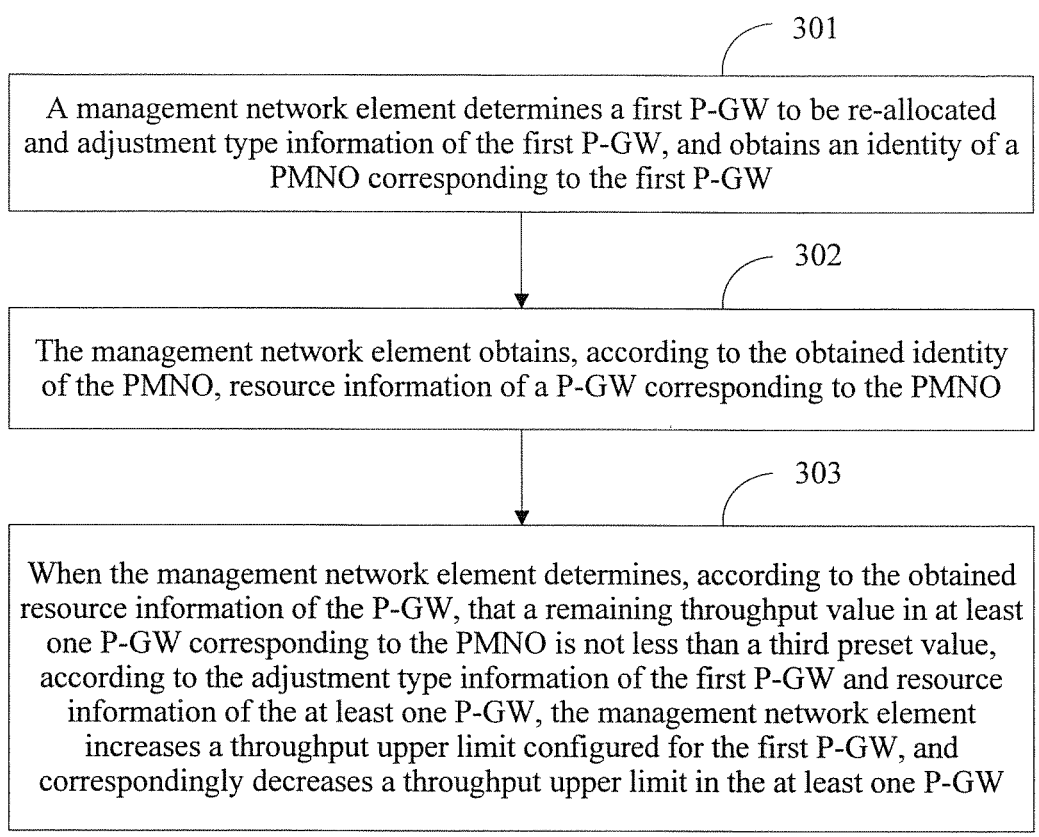
FIG. 3 is still another flowchart of a method for dynamic resource adjustment based on network sharing according to the present invention.

In addition to the implementation manner in the foregoing embodiment, referring to FIG. 3, FIG. 3 shows still another flowchart of a method for dynamic resource adjustment based on network sharing according to the present invention, where the method includes the following steps:

Step 301: A management network element determines a first P-GW to be re-allocated and adjustment type information of the first P-GW, and obtains an identity of a PMNO corresponding to the first P-GW.

An implementation process of step 301 is the same as an implementation process of step 201, and the inventor provides no further details herein.

Step 302: The management network element obtains, according to the obtained identity of the PMNO, resource information of a P-GW corresponding to the PMNO.

In this embodiment, the management network element searches for, according to the obtained identity of the PMNO, P-GWs corresponding to the PMNO, and sequentially obtains resource information of the P-GWs.

The resource information of the P-GW includes a throughput upper limit of the P-GW and a currently used throughput value in the P-GW. Therefore, the management network element learns a current remaining throughput value in the P-GW according to the resource information of the P-GW.

Step 303: When the management network element determines, according to the obtained resource information of the P-GW, that a remaining throughput value in at least one P-GW corresponding to the PMNO is not less than a third preset value, according to the adjustment type information of the first P-GW and resource information of the at least one P-GW, the management network element increases a throughput upper limit configured for the first P-GW, and correspondingly decreases a throughput upper limit in the at least one P-GW.

The third preset value is a value indicating that the PMNO currently has many remaining throughput capabilities, and may be set according to the throughput upper limit configured for the P-GW. For example, it is assumed that the throughput upper limit configured for the first P-GW is 100, and the third preset value may be set to 50. When a remaining throughput value in the first P-GW is not less than 50, it indicates that the first P-GW has many remaining throughput capabilities. It is assumed that a throughput upper limit configured for a second P-GW is 200, and the third preset value may be set to 100. When a remaining throughput value in the second P-GW is not less than 100, it indicates that the second P-GW has many remaining throughput capabilities.

In this embodiment, when the management network element sequentially obtains the resource information of the P-GWs, and when learning that a remaining throughput value in a P-GW is not less than the third preset value, the management network element does not continue to obtain resource information of another P-GW, but directly adjusts the throughput upper limit configured for the first P-GW.

Specifically, for example, P-GWs corresponding to the PMNO are respectively the first P-GW, the second P-GW, a third P-GW, and a fourth P-GW. When the management network element determines that the first P-GW is to be re-allocated, and when the management network element learns that the remaining throughput value in the second P-GW is not less than the third preset value, that is, the second P-GW currently has many remaining throughput capabilities, the management network element stops obtaining resource information of the third P-GW and the fourth P-GW, directly increases the throughput upper limit configured for the first P-GW, and correspondingly decreases a throughput upper limit in the second P-GW.

Therefore, according to the foregoing technical solution of the present invention, the management network element does not need to obtain the resource information of all the P-GWs corresponding to the PMNO, which reduces working load of the management network element.

In the foregoing two implementation manners, when re-allocating the throughput upper limit configured for the first P-GW corresponding to the PMNO, the management network element may increase the throughput upper limit configured for the first P-GW by a preset throughput value. The management network element sets by default that a change of a preset throughput value is made to a to-be-re-allocated P-GW when re-allocation is performed. Specifically, for example, when performing re-allocation, the management network element increases the throughput upper limit configured for the first P-GW to be re-allocated by a throughput value 30 each time, and correspondingly decreases throughput upper limits configured for other P-GWs. A sum of decreased throughput upper limits configured for the other P-GWs is equal to 30.

It should be noted that, because when receiving a request that causes an increase in a throughput value, the first P-GW cannot immediately and accurately learn a throughput value by which the first P-GW needs to be increased, not to mention the management network element to learn a throughput that needs to be re-allocated to the first P-GW. To ensure that the first P-GW satisfies a required throughput after only one time of re-allocation for the first P-GW, when setting a preset throughput value, the management network element should ensure as much as possible that the first P-GW can complete a received request while the first P-GW does not have too many idle throughput capabilities, so as to reach maximum utilization of the first P-GW.

Preferably, the management network element may increase, according to a total throughput value currently required by the first P-GW, the throughput upper limit in the first P-GW to the total throughput value currently required by the first P-GW. The foregoing case is still used as an example for further description. A total throughput value required by the first P-GW after the request is received is 120, and the management network element increases, according to the total throughput value 120 currently required by the first P-GW, the throughput upper limit 100 in the first P-GW to the total throughput value 120 currently required by the first P-GW; and correspondingly decreases a throughput upper limit/limits in the second P-GW and/or the third P-GW at the same time.

In this embodiment, the total throughput value required by the first P-GW may be obtained by the first P-GW in advance by means of estimation. That is, after receiving the request, the first P-GW estimates, in advance, an increased throughput value that may be caused by the request, and sends, to the management network element, the information about the increased throughput value that may be caused. The management network element re-allocates the first P-GW according to the information.

Case 2: The adjustment type information of the first P-GW is decreasing the throughput upper limit in the first P-GW.

Figure 4:
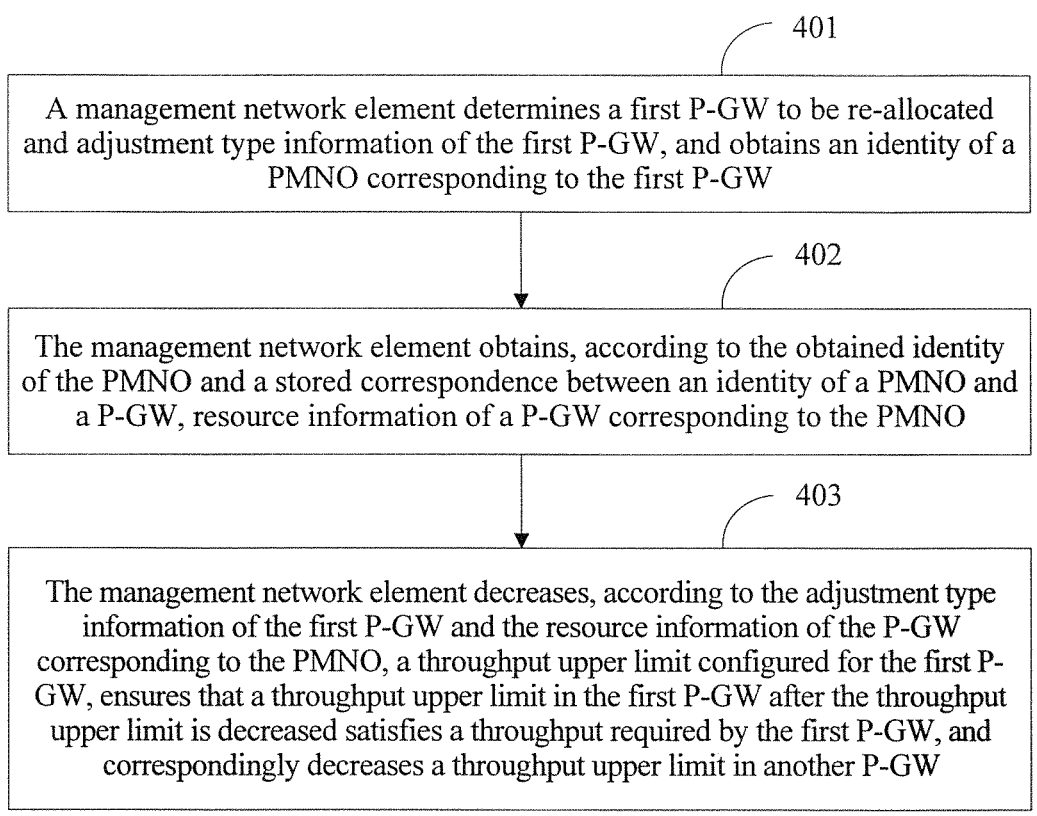
FIG. 4 is yet another flowchart of a method for dynamic resource adjustment based on network sharing according to the present invention.

Referring to FIG. 4, FIG. 4 shows yet another flowchart of a method for dynamic resource adjustment based on network sharing according to the present invention, where the method includes the following steps:

Step 401: A management network element determines a first P-GW to be re-allocated and adjustment type information of the first P-GW, and obtains an identity of a PMNO corresponding to the first P-GW.

Step 402: The management network element obtains, according to the obtained identity of the PMNO and a stored correspondence between an identity of a PMNO and a P-GW, resource information of a P-GW corresponding to the PMNO.

Step 403: The management network element decreases, according to the adjustment type information of the first P-GW and the resource information of the P-GW corresponding to the PMNO, a throughput upper limit configured for the first P-GW, ensures that a throughput upper limit in the first P-GW after the throughput upper limit is decreased satisfies a throughput required by the first P-GW, and correspondingly decreases a throughput upper limit in another P-GW.

In this embodiment, when decreasing the throughput upper limit configured for the first P-GW, the management network element should ensure that the throughput upper limit in the first P-GW after the throughput upper limit is decreased satisfies the throughput currently required by the first P-GW.

Specifically, when re-allocating the throughput upper limit configured for the first P-GW corresponding to the PMNO, the management network element may decrease a preset throughput value to the throughput upper limit configured for the first P-GW. The management network element sets by default that a change of a preset throughput value is made to a to-be-re-allocated P-GW when re-allocation is performed. Specifically, for example, when performing re-allocation, the management network element decreases the throughput upper limit configured for the first P-GW to be re-allocated by a throughput value 30 each time, and correspondingly increases throughput upper limits configured for other P-GWs. A sum of correspondingly increased throughput upper limits configured for the other P-GWs is equal to 30.

In the present invention, to fully increase resource utilization of each P-GW, it should be ensured as much as possible that a used throughput value in each P-GW is close to a throughput upper limit configured for each P-GW. In this embodiment, preferably, after the management network element determines that the adjustment type information of the first P-GW to be re-allocated is decreasing the throughput upper limit in the first P-GW, the management network element decreases the throughput upper limit in the first P-GW to a used throughput value in the first P-GW according to the used throughput value in the first P-GW, which increases resource utilization of the first P-GW.

In addition to the foregoing implementation manner, the management network element may further decrease, according to a change history record of the throughput upper limit in the first P-GW, the throughput upper limit configured for the first P-GW to an original preset value of the throughput upper limit configured for the first P-GW.

It should be noted that, an application scenario in this embodiment may further be applied in Case 1. That is, after the throughput upper limit configured for the first P-GW corresponding to the PMNO is increased, when the management network element decreases, according to the adjustment type information that is of the first P-GW and is of decreasing the throughput upper limit configured for the first P-GW and the resource information of the P-GW corresponding to the PMNO, the throughput upper limit configured for the first P-GW, the first P-GW decreases, according to the change history record of the throughput upper limit in the first P-GW, the throughput upper limit currently configured for the first P-GW to the original preset value of the throughput upper limit configured for the first P-GW, so as to ensure balance between throughput capabilities of P-GWs corresponding to the PMNO.

In this case, to ensure that the first P-GW still satisfies the throughput required by the first P-GW after the throughput upper limit currently configured for the first P-GW is decreased to the original preset value of the throughput upper limit configured for the first P-GW, before the management network element decreases, according to the change history record of the throughput upper limit in the first P-GW, the throughput upper limit configured for the first P-GW to the original preset value of the throughput upper limit configured for the first P-GW, the method further includes:

Step 4031: The management network element determines, according to the change history record of the throughput upper limit in the first P-GW, whether the original preset value of the throughput upper limit in the first P-GW is not less than a used throughput value in the first P-GW; if the original preset value of the throughput upper limit in the first P-GW is not less than the used throughput value in the first P-GW, performs step 4032.

In this embodiment, when the original preset value of the throughput upper limit in the first P-GW is less than the currently used throughput value in the first P-GW, the management network element decreases the throughput upper limit in the first P-GW to the original preset value of the throughput upper limit in the first P-GW. In this case, the first P-GW after the throughput upper limit is decreased cannot satisfy the throughput currently required by the first P-GW, and therefore, an error occurs in the first P-GW, and the first P-GW cannot continue to work properly. When the original preset value of the throughput upper limit in the first P-GW is not less than the currently used throughput value in the first P-GW, it indicates that the first P-GW after the throughput upper limit is decreased still satisfies the throughput currently required by the first P-GW, which ensures that the first P-GW works properly.

Step 4032: The management network element decreases the throughput upper limit configured for the first P-GW to the original preset value of the throughput upper limit configured for the first P-GW.

According to the foregoing technical solution of the present invention, a management network element can implement re-allocation of a throughput upper limit configured for a P-GW corresponding to a PMNO, so that a re-allocated throughput upper limit of the P-GW satisfies a throughput currently required by the P-GW, which increases utilization of a network resource.

In the present invention, the management network element may include a policy and charging rules function PCRF or a service platform Service Platform. In actual application, a manner of setting a throughput upper limit in a P-GW may be dynamically allocating, by using a service platform updating license, a quantity of licensed resources in P-GWs corresponding to a PMNO. Therefore, when the management network element in the present invention is the service platform, after receiving a re-allocation request sent by a first P-GW, the service platform directly completes, according to the re-allocation request, re-allocation of throughput upper limits between the first P-GW and another P-GW that are corresponding to the PMNO. However, when the management network element is the PCRF, the first P-GW first needs to find the PCRF. The PCRF further sends a re-allocation request to a service platform, and completes re-allocation of throughput upper limits between the first P-GW and another P-GW that are corresponding to the PMNO.

In the present invention, the PCRF may belong to a PMNO, or may belong to an MNO. When the PCRF belongs to the PMNO, the first P-GW may find the PCRF according to a routing relationship when a network is established. When the PCRF belongs to the MNO, because multiple PCRFs may be deployed in one MNO, an identity used to identify a PMNO needs to be carried to perform addressing, so as to find the PCRF. Herein, implementation manners of finding the PCRF by using the routing relationship and finding the PCRF by performing addressing by using the identity of the PMNO are the same as the prior art, and the inventor provides no further details herein.

Figure 5:
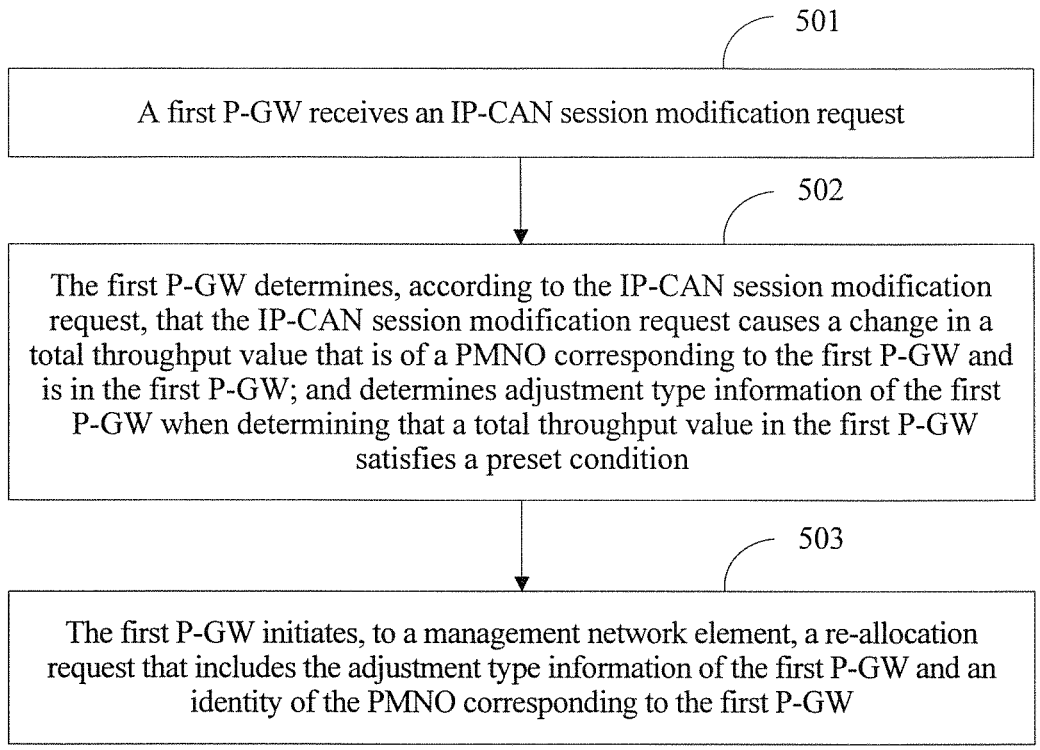
FIG. 5 is still yet another flowchart of a method for dynamic resource adjustment based on network sharing according to the present invention.

On the basis of the foregoing embodiment, referring to FIG. 5, FIG. 5 shows still yet another flowchart of a method for dynamic resource adjustment based on network sharing according to the present invention. The method is applied to a first P-GW, where there is a correspondence between the first P-GW and a mobile network operator PMNO, and a total throughput value configured for the PMNO by a management network element is equal to a sum of throughput upper limits configured for P-GWs corresponding to the PMNO. The method includes the following steps:

Step 501: The first P-GW receives an IP-CAN (IP-connectivity access network) session modification request.

The IP-CAN session modification request includes a request for increasing a throughput upper limit in the first P-GW, a request for decreasing a throughput upper limit in the first P-GW, and a request for not changing a throughput upper limit in the first P-GW. The request for increasing the throughput upper limit in the first P-GW includes any one of a dedicated bearer setup request, a dedicated bearer activation request, or a dedicated bearer update request. The request for decreasing the throughput upper limit in the first P-GW includes a dedicated bearer deletion request or a dedicated bearer update request. The request for not changing the throughput upper limit in the first P-GW includes a dedicated bearer update request.

Specifically, that the first P-GW receives an IP-CAN session modification request may specifically include: the first P-GW receives an IP-CAN session modification request sent by user equipment UE, a mobility management entity MME, or a policy and charging rules function PCRF.

Step 502: Determine adjustment type information of the first P-GW when the first P-GW determines, according to the IP-CAN session modification request, that the IP-CAN session modification request causes a change in a total throughput value that is of a PMNO corresponding to the first P-GW and is in the first P-GW, and that a total throughput value in the first P-GW satisfies a preset condition.

The total throughput value in the first P-GW refers to a currently used throughput value in the first P-GW.

In this embodiment, after receiving the IP-CAN session modification request, the first P-GW first determines that the IP-CAN session modification request causes a change in the total throughput value that is of the PMNO corresponding to the first P-GW and is in the first P-GW. Specifically, when the IP-CAN session modification request is the request for increasing the throughput upper limit in the first P-GW, after receiving the request, the first P-GW gradually increases the currently used throughput value in the first P-GW, and in this case, determines that the total throughput value that is of the PMNO corresponding to the first P-GW and is in the first P-GW changes. When the IP-CAN session modification request is the request for decreasing the throughput upper limit in the first P-GW, after receiving the request, the first P-GW gradually decreases the currently used throughput value in the first P-GW, and in this case, determines that the total throughput value that is of the PMNO corresponding to the first P-GW and is in the first P-GW changes.

In this embodiment, the preset condition may include whether the used throughput value in the first P-GW is greater than a first preset threshold, or whether the used throughput value in the first P-GW is less than a second preset threshold. The first preset threshold and the second preset threshold are used to indicate a current resource use state of the first P-GW. For example, when a throughput upper limit configured for the first P-GW is 100, the first preset threshold may be 90, and when the used throughput value in the first P-GW is greater than the first preset threshold 90, it indicates that the first P-GW is currently in an almost saturated state, and has few remaining throughputs. The second preset threshold may be 10, and when the used throughput value in the first P-GW is less than the second preset threshold 10, it indicates that the first P-GW is in an idle state, and has many remaining throughputs. Therefore, when the first P-GW receives the IP-CAN session modification request for increasing the throughput upper limit in the first P-GW, and the used throughput value in the first P-GW is greater than the first preset threshold, it is determined that the first P-GW satisfies the preset condition.

Alternatively, when the first P-GW receives the IP-CAN session modification request for decreasing the throughput upper limit in the first P-GW, and the used throughput value in the first P-GW is less than the second preset threshold, it is determined that the first P-GW satisfies the preset condition.

In addition, when the IP-CAN session modification request is the request for increasing the throughput upper limit in the first P-GW, it is determined that the adjustment type information of the first P-GW is increasing the throughput upper limit in the first P-GW; or when the IP-CAN session modification request is the request for decreasing the throughput upper limit in the first P-GW, it is determined that the adjustment type information of the first P-GW is decreasing the throughput upper limit in the first P-GW.

Step 503: The first P-GW initiates, to a management network element, a re-allocation request that includes the adjustment type information of the first P-GW and an identity of the PMNO corresponding to the first P-GW, so that after receiving the re-allocation request, the management network element adjusts, according to the re-allocation request, a throughput upper limit configured for the first P-GW and a throughput upper limit configured for another P-GW corresponding to the PMNO, so as to satisfy a throughput required by the first P-GW.

Specifically, in this embodiment, when the management network element receives the re-allocation request that is initiated by the first P-GW and that includes the adjustment type information of the first P-GW and the identity of the PMNO corresponding to the first P-GW, the management network element determines that the first P-GW is to be re-allocated; obtains, according to the identity that is of the PMNO and is in the re-allocation request and a correspondence that is between the identity of the PMNO and a P-GW and is stored in the management network element, resource information of a P-GW corresponding to the PMNO; and further adjusts, according to the adjustment type information of the first P-GW and the resource information of the P-GW corresponding to the PMNO and based on that a sum of throughput upper limits of P-GWs corresponding to the PMNO is equal to the total throughput value of the PMNO, the throughput upper limit configured for the first P-GW and the throughput upper limit configured for the another P-GW corresponding to the PMNO, so as to satisfy the throughput required by the first P-GW.

According to the foregoing technical solution of the present invention, when a first P-GW does not have sufficient throughput capabilities to receive an IP-CAN session modification request, the first P-GW actively sends a re-allocation request to a management network element to request to increase a throughput upper limit configured for the first P-GW, so as to successfully receive the IP-CAN session modification request. In a case in which a throughput capability of the first P-GW is in an idle state for a long time, and the first P-GW has low network resource utilization, the first P-GW actively sends a re-allocation request to the management network element to request to decrease the throughput upper limit in the first P-GW, so as to allocate an idle throughput capability of the first P-GW to another P-GW, and preferably, the throughput upper limit may be re-allocated to another P-GW with an almost saturated throughput capability. Therefore, resource utilization of P-GWs is increased, and network resource utilization is further improved.

Figure 6:
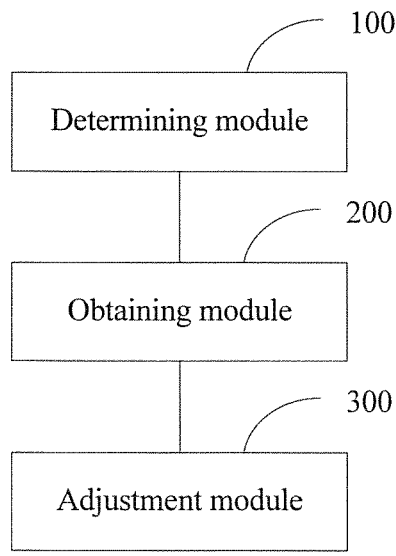
FIG. 6 is a schematic structural diagram of an apparatus for dynamic resource adjustment based on network sharing according to the present invention.

Based on the foregoing embodiments of the method for dynamic resource adjustment based on network sharing provided in the present invention, the present invention further provides an apparatus for dynamic resource adjustment based on network sharing. Referring to FIG. 6, FIG. 6 shows a schematic structural diagram of an apparatus for dynamic resource adjustment based on network sharing. The apparatus includes: a determining module 100, an obtaining module 200, and an adjustment module 300.

The determining module 100 is configured to: determine a first P-GW to be re-allocated and adjustment type information of the first P-GW, and obtain an identity of a PMNO corresponding to the first P-GW.

In the present invention, one PMNO may be corresponding to multiple P-GWs, or one P-GW may be corresponding to multiple PMNOs. To differentiate the PMNOs corresponding to the same PGW, identities of the PMNOs corresponding to the P-GW need to be obtained, and differentiation of the PMNOs may be implemented by using the identities of the PMNOs. In this embodiment, there may be the following implementation manners of determining, by determining module 100, the first P-GW to be re-allocated:

Manner 1: The determining module 100 is specifically configured to determine that the first P-GW satisfies a preset condition.

When determining that the first P-GW satisfies the preset condition, the determining module 100 determines that the first P-GW is to be re-allocated; determines the adjustment type information of the first P-GW; and obtains, according to a stored correspondence between an identity of a PMNO and a P-GW, the identity of the PMNO corresponding to the first P-GW.

In this embodiment, the preset condition may include whether a ratio of a used throughput value in the first P-GW to a throughput upper limit is greater than a first preset value, or whether a ratio of a used throughput value in the first P-GW to a throughput upper limit is less than a second preset value.

Figure 7:
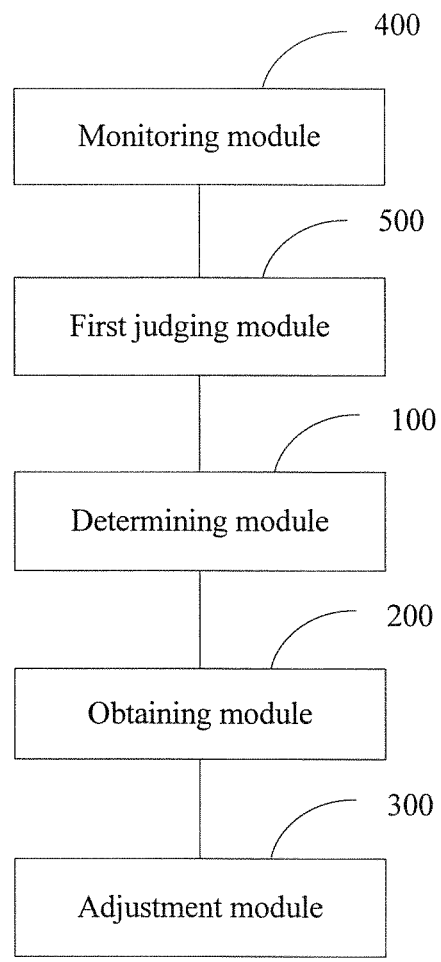
FIG. 7 is another schematic structural diagram of an apparatus for dynamic resource adjustment based on network sharing according to the present invention.

Based on this, the apparatus for dynamic resource adjustment based on network sharing protected by the present invention may further include a monitoring module 400 and a first judging module 500. Referring to FIG. 7, FIG. 7 shows another schematic structural diagram of the apparatus for dynamic resource adjustment based on network sharing according to the present invention. The monitoring module 400 is configured to monitor periodically or in real time a throughput use status in the P-GW. The first judging module 500 is configured to: determine whether the ratio of the used throughput value in the first P-GW to the throughput upper limit is greater than the first preset value, and/or determine whether the ratio of the used throughput value in the first P-GW to the throughput upper limit is less than the second preset value.

In this case, that the determining module 100 determines that the first P-GW satisfies the preset condition specifically includes:

when the first judging module 500 determines that the ratio of the used throughput value in the first P-GW to the throughput upper limit is greater than the first preset value, the determining module 100 determines that the first P-GW is to be re-allocated, and that the adjustment type information of the first P-GW is increasing the throughput upper limit configured for the first P-GW; or when the first judging module 500 determines that the ratio of the used throughput value in the first P-GW to the throughput upper limit is less than the second preset value, the determining module 100 determines that the first P-GW is to be re-allocated, and that the adjustment type information of the first P-GW is decreasing the throughput upper limit configured for the first P-GW.

Manner 2: The determining module 100 determines that a re-allocation request sent by the first P-GW is received.

Figure 8:
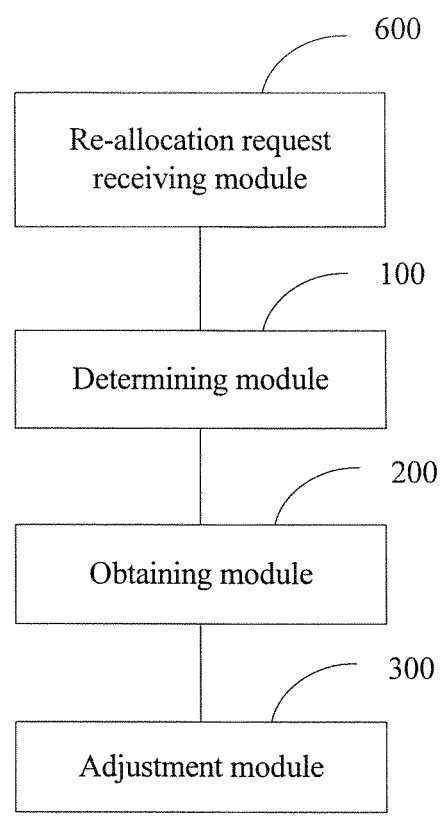
FIG. 8 is still another schematic structural diagram of an apparatus for dynamic resource adjustment based on network sharing according to the present invention.

In this embodiment, the apparatus for dynamic resource adjustment based on network sharing protected by the present invention may further include a re-allocation request receiving module 600. Referring to FIG. 8, FIG. 8 shows still another schematic structural diagram of the apparatus for dynamic resource adjustment based on network sharing according to the present invention. The re-allocation request receiving module 600 is configured to receive a re-allocation request sent by the first P-GW.

In this embodiment, the re-allocation request that is sent by the first P-GW and is received by the re-allocation request receiving module 600 carries the adjustment type information of the first P-GW and the identity of the PMNO corresponding to the first P-GW. Therefore, the determining module 100 is specifically configured to: when the re-allocation request receiving module 600 receives the re-allocation request sent by the first P-GW, determine that the first P-GW is to be re-allocated; and determine the adjustment type information of the first P-GW and the identity of the PMNO according to the adjustment type information of the first P-GW and the identity of the PMNO corresponding to the first P-GW, where the adjustment type information and the identity are carried in the re-allocation request.

The adjustment type information may include information of increasing a throughput upper limit or information of decreasing a throughput upper limit.

The obtaining module 200 is configured to obtain, according to the identity that is of the PMNO and is obtained by the determining module 100 and the stored correspondence between an identity of a PMNO and a P-GW, resource information of a P-GW corresponding to the PMNO.

The resource information of the P-GW may include a throughput upper limit configured for the P-GW and a currently used throughput value in the P-GW.

On the basis of the embodiment in the foregoing Manner 2, the re-allocation request may further include resource information of the first P-GW. In this case, the obtaining module 200 is specifically configured to obtain, according to the identity of the PMNO, resource information of another P-GW, except the first P-GW, corresponding to the PMNO.

The adjustment module 300 is configured to adjust, according to the adjustment type information that is of the first P-GW and is determined by the determining module 100 and the resource information that is of the P-GW corresponding to the PMNO and is obtained by the obtaining module 200, and based on that a sum of throughput upper limits of P-GWs corresponding to the PMNO is equal to a total throughput value of the PMNO, the throughput upper limit configured for the first P-GW and a throughput upper limit configured for the another P-GW corresponding to the PMNO, so as to satisfy a throughput required by the first P-GW.

In this embodiment, the adjustment type information of the first P-GW may include increasing the throughput upper limit in the first P-GW or decreasing the throughput upper limit in the first P-GW. When the adjustment type information of the first P-GW is increasing the throughput upper limit in the first P-GW, the adjustment module 300 increases the throughput upper limit configured for the first P-GW, so that the first P-GW after the throughput upper limit is increased satisfies the throughput required by the first P-GW; at the same time, the adjustment module 300 correspondingly decreases, according to the resource information of the another P-GW corresponding to the PMNO, the throughput upper limit configured for the another P-GW.

When the adjustment type information of the first P-GW is decreasing the throughput upper limit in the first P-GW, the adjustment module 300 decreases the throughput upper limit configured for the first P-GW, and ensures that the first P-GW after the throughput upper limit is decreased still satisfies the throughput required by the first P-GW; at the same time, the adjustment module 300 correspondingly increases, according to the resource information of the another P-GW corresponding to the PMNO, the throughput upper limit configured for the another P-GW.

Figure 9:
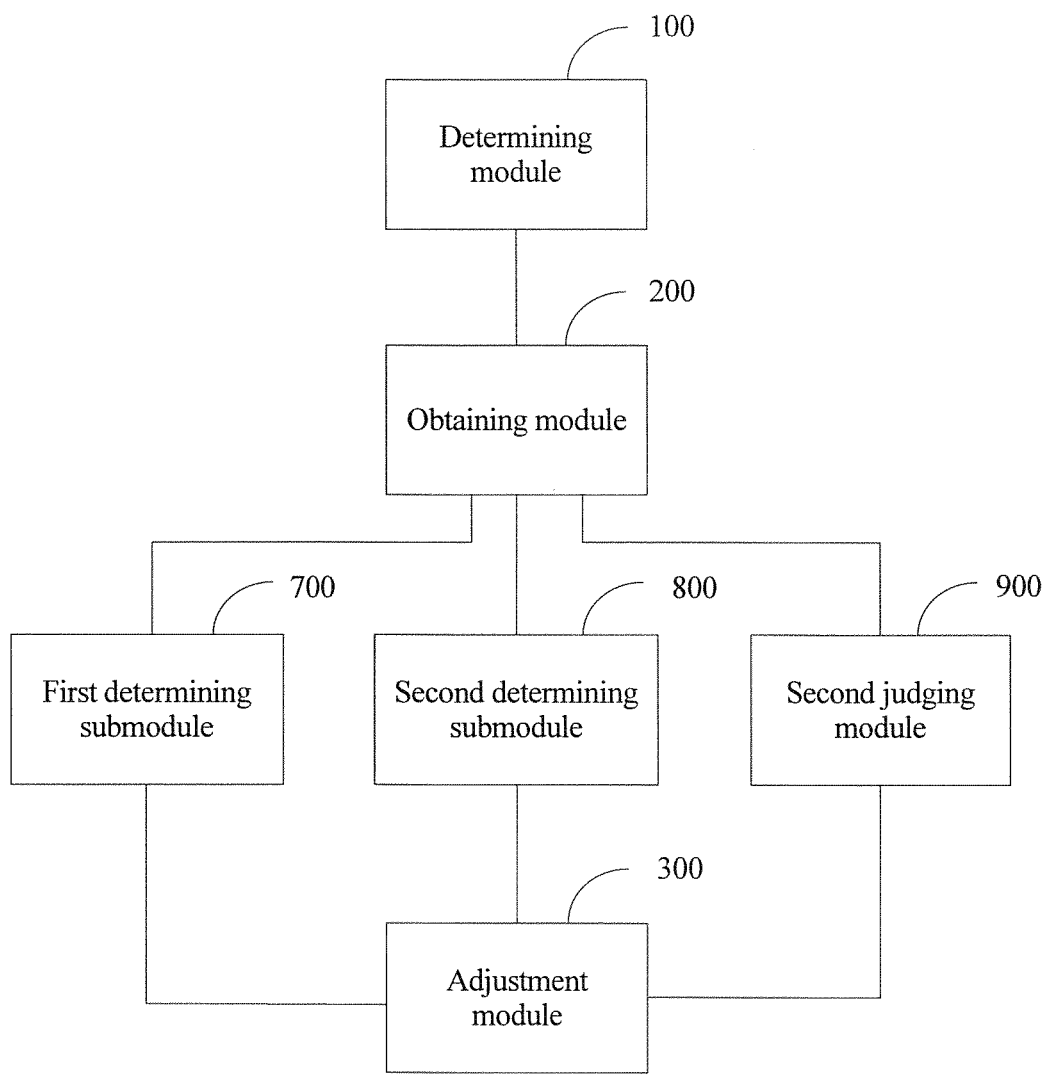
FIG. 9 is yet another schematic structural diagram of an apparatus for dynamic resource adjustment based on network sharing according to the present invention.

Specifically, when the adjustment type information of the first P-GW is increasing the throughput upper limit in the first P-GW, the obtaining module 200 is specifically configured to obtain, according to the identity that is of the PMNO and is obtained by the determining module 100, the resource information of the P-GW corresponding to the PMNO. In this case, the apparatus for dynamic resource adjustment based on network sharing protected by the present invention may further include a first determining submodule 700. Referring to FIG. 9, FIG. 9 shows yet another schematic structural diagram of the apparatus for dynamic resource adjustment based on network sharing according to the present invention. The first determining submodule 700 is configured to determine, according to the resource information that is of the P-GW and is obtained by the obtaining module 200, that a remaining throughput value in at least one P-GW is not less than a third preset value. In this case, the adjustment module 300 is specifically configured to: according to the adjustment type information of the first P-GW and resource information of the at least one P-GW, increase the throughput upper limit configured for the first P-GW, and correspondingly decrease a throughput upper limit in the at least one P-GW.

In addition, when the adjustment type information of the first P-GW is increasing the throughput upper limit in the first P-GW, the obtaining module 200 may be further specifically configured to obtain, according to the identity that is of the PMNO and is obtained by the determining module 100, resource information of all the P-GWs corresponding to the PMNO. In this case, the apparatus for dynamic resource adjustment based on network sharing protected by the present invention may further include a second determining submodule 800. The second determining submodule 800 is configured to determine, according to the resource information that is of all the P-GWs corresponding to the PMNO and is obtained by the obtaining module 200, that a used throughput value in all the P-GWs is not greater than a fourth preset value. In this case, the adjustment module 300 is specifically configured to: according to the adjustment type information of the first P-GW and the resource information of all the P-GWs corresponding to the PMNO, increase the throughput upper limit configured for the first P-GW, and correspondingly decrease the throughput upper limit in the another P-GW.

In this embodiment, the adjustment module 300 may be specifically configured to: increase a preset throughput value to the throughput upper limit configured for the first P-GW; or when the re-allocation request includes a total throughput value required by the first P-GW, increase, according to the total throughput value required by the first P-GW, the throughput upper limit in the first P-GW to the total throughput value required by the first P-GW. The total throughput value required by the first P-GW is obtained by the first P-GW in advance by means of estimation.

Specifically, when the adjustment type information of the first P-GW is decreasing the throughput upper limit in the first P-GW, the adjustment module 300 is specifically configured to: decrease the throughput upper limit configured for the first P-GW, ensure that a throughput upper limit in the first P-GW after the throughput upper limit is decreased satisfies the throughput required by the first P-GW, and correspondingly increase the throughput upper limit configured for the another P-GW.

In this embodiment, the adjustment module 300 is specifically configured to: decrease a preset throughput value to the throughput upper limit configured for the first P-GW, or decrease the throughput upper limit in the first P-GW to the used throughput value in the first P-GW according to the used throughput value in the first P-GW.

In addition, the adjustment module 300 may be specifically configured to decrease, according to a change history record of the throughput upper limit configured for the first P-GW, the throughput upper limit configured for the first P-GW to an original preset value of the throughput upper limit configured for the first P-GW.

On the basis of the foregoing embodiment, the apparatus for dynamic resource adjustment based on network sharing protected by the present invention may further include a second judging module 900, still as shown in FIG. 9. The second judging module 900 is configured to determine, according to the change history record of the throughput upper limit in the first P-GW, whether the original preset value of the throughput upper limit in the first P-GW is not less than the used throughput value in the first P-GW.

In this case, the adjustment module 300 is specifically configured to: when the second judging module 900 determines that the original preset value of the throughput upper limit in the first P-GW is not less than the used throughput value in the first P-GW, decrease the throughput upper limit configured for the first P-GW to the original preset value of the throughput upper limit configured for the first P-GW.

According to the foregoing technical solution of the present invention, a determining module 100 determines a first P-GW to be re-allocated and adjustment type information of the first P-GW, and obtains an identity of a PMNO corresponding to the first P-GW. Further, an obtaining module 200 obtains, according to the obtained identity of the PMNO and a stored correspondence between an identity of a PMNO and a P-GW, resource information of a P-GW corresponding to the PMNO. Finally, an adjustment module 300 adjusts, according to the adjustment type information of the first P-GW and the resource information of the P-GW corresponding to the PMNO and based on that a sum of throughput upper limits of P-GWs corresponding to the PMNO is equal to a total throughput value of the PMNO, a throughput upper limit configured for the first P-GW and a throughput upper limit configured for another P-GW corresponding to the PMNO, so as to satisfy a throughput required by the first P-GW. Therefore, when a remaining total throughput value of the PMNO does not yet reach a total subscribed throughput value, after a P-GW receives a request that is sent by the PMNO and that causes an increase in a throughput value, a management network element re-allocates the throughput upper limits of the P-GWs corresponding to the PMNO, so that a throughput upper limit of the P-GW is sufficient to provide an increased throughput value caused by the request sent by the PMNO, which saves a network resource, increases utilization of a network resource, and improves user experience.

In addition, an embodiment of the present invention further provides an apparatus for dynamic resource adjustment based on network sharing. The apparatus may be a host server that has a computing capability, a personal computer PC, a portable computer or terminal, or the like, and specific implementation of the apparatus is not limited in a specific embodiment of the present invention.

Figure 10:
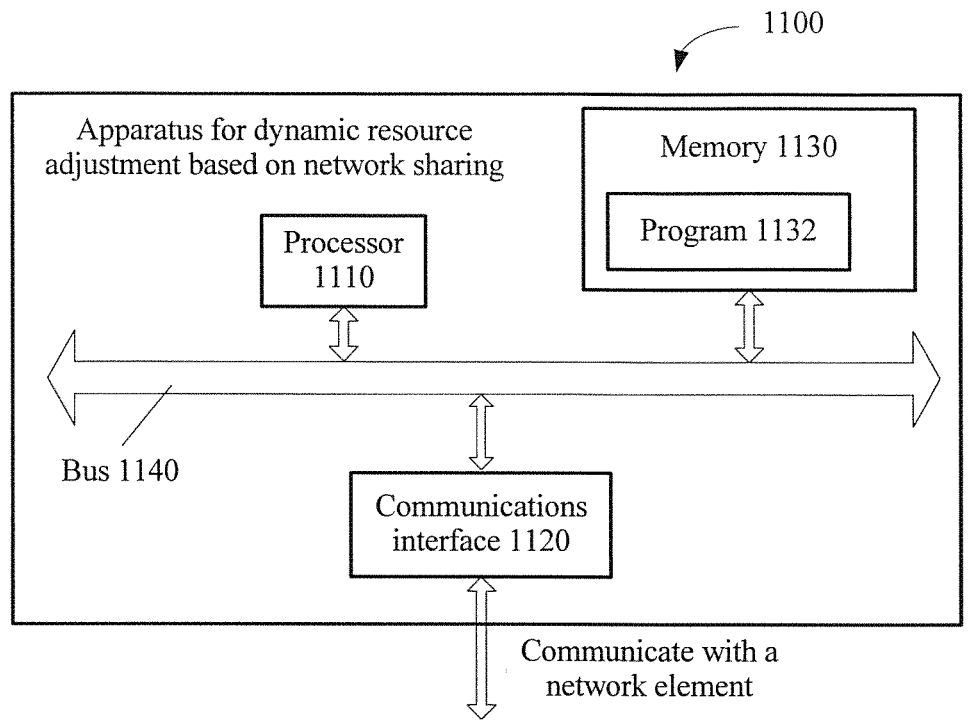
FIG. 10 is still yet another schematic structural diagram of an apparatus for dynamic resource adjustment based on network sharing according to the present invention.

FIG. 10 is still yet another schematic structural diagram of an apparatus for dynamic resource adjustment based on network sharing according to the present invention. As shown in FIG. 10, an apparatus 1100 for dynamic resource adjustment based on network sharing includes:

a processor (processor) 1110, a communications interface (Communications Interface) 1120, a memory (memory) 1130, and a bus 1140.

The processor 1110, the communications interface 1120, and the memory 1130 complete communication with each other by using the bus 1140.

The processor 1110 is configured to execute a program 1132.

Specifically, the program 1132 may include program code, where the program code includes a computer operation instruction.

The processor 1110 may be a central processing unit CPU, or an application-specific integrated circuit ASIC (Application Specific Integrated Circuit), or one or more integrated circuits configured to implement this embodiment of this application.

The memory 1130 is configured to store the program 1132. The memory 1130 may include a high-speed RAM memory, and may further include a non-volatile memory (non-volatile memory), such as at least one disk memory. The program 1132 may specifically include: determining a first P-GW to be re-allocated and adjustment type information of the first P-GW, and obtaining an identity of a PMNO corresponding to the first P-GW;

obtaining, according to the obtained identity of the PMNO and a stored correspondence between an identity of a PMNO and a P-GW, resource information of a P-GW corresponding to the PMNO; and adjusting, according to the adjustment type information of the first P-GW and the resource information of the P-GW corresponding to the PMNO and based on that the sum of throughput upper limits of P-GWs corresponding to the PMNO is equal to the total throughput value of the PMNO, the throughput upper limit configured for the first P-GW and the throughput upper limit configured for the another P-GW corresponding to the PMNO, so as to satisfy a throughput required by the first P-GW.

Preferably, the program 1132 may further include: the determining a first P-GW to be re-allocated and adjustment type information of the first P-GW, and obtaining an identity of a PMNO corresponding to the first P-GW includes: receiving a re-allocation request sent by the first P-GW, and determining that the first P-GW is to be re-allocated; and determining the adjustment type information of the first P-GW and the identity of the PMNO according to the adjustment type information of the first P-GW and the identity of the PMNO corresponding to the first P-GW, where the adjustment type information and the identity are carried in the re-allocation request.

Preferably, the program 1132 may further include: the determining a first P-GW to be re-allocated and adjustment type information of the first P-GW, and obtaining an identity of a PMNO corresponding to the first P-GW includes: determining, by the management network element when determining that the first P-GW satisfies a preset condition, that the first P-GW is to be re-allocated, and determining the adjustment type information of the first P-GW; and obtaining, by the management network element according to the stored correspondence between an identity of a PMNO and a P-GW, the identity of the PMNO corresponding to the first P-GW.

Preferably, the program 1132 may further include: the determining, when determining that the first P-GW satisfies a preset condition, that the first P-GW is to be re-allocated, and determining the adjustment type information of the first P-GW includes: when determining that a ratio of a used throughput value in the first P-GW to the throughput upper limit is greater than a first preset value, determining that the first P-GW is to be re-allocated and that the adjustment type information of the first P-GW is increasing the throughput upper limit configured for the first P-GW; or when determining that a ratio of a used throughput value in the first P-GW to the throughput upper limit is less than a second preset value, determining that the first P-GW is to be re-allocated and that the adjustment type information of the first P-GW is decreasing the throughput upper limit configured for the first P-GW.

Preferably, the program 1132 may further include: when the re-allocation request further includes resource information of the first P-GW, the obtaining, according to the obtained identity of the PMNO and a stored correspondence between an identity of a PMNO and a P-GW, resource information of a P-GW corresponding to the PMNO includes:

obtaining, according to the identity of the PMNO, resource information of the another P-GW, except the first P-GW, corresponding to the PMNO.

Preferably, the program 1132 may further include: when the adjustment type information of the first P-GW is increasing the throughput upper limit in the first P-GW, the obtaining, according to the obtained identity of the PMNO and a stored correspondence between an identity of a PMNO and a P-GW, resource information of a P-GW corresponding to the PMNO includes:

obtaining, according to the obtained identity of the PMNO, the resource information of the P-GW corresponding to the PMNO; and when determining, according to the obtained resource information of the P-GW, that a remaining throughput value in at least one P-GW is not less than a third preset value, adjusting, according to the adjustment type information of the first P-GW and the resource information of the P-GW corresponding to the PMNO and based on that the sum of throughput upper limits of P-GWs corresponding to the PMNO is equal to the total throughput value of the PMNO, the throughput upper limit configured for the first P-GW and the throughput upper limit configured for the another P-GW corresponding to the PMNO; where the adjusting, according to the adjustment type information of the first P-GW and the resource information of the P-GW corresponding to the PMNO and based on that the sum of throughput upper limits of P-GWs corresponding to the PMNO is equal to the total throughput value of the PMNO, the throughput upper limit configured for the first P-GW and the throughput upper limit configured for the another P-GW corresponding to the PMNO specifically includes:

according to the adjustment type information of the first P-GW and resource information of the at least one P-GW, increasing the throughput upper limit configured for the first P-GW, and correspondingly decreasing a throughput upper limit in the at least one P-GW.

Preferably, the program 1132 may further include: when the adjustment type information of the first P-GW is increasing the throughput upper limit in the first P-GW, the obtaining, according to the obtained identity of the PMNO and a stored correspondence between an identity of a PMNO and a P-GW, resource information of a P-GW corresponding to the PMNO specifically includes:

obtaining, according to the obtained identity of the PMNO, resource information of all the P-GWs corresponding to the PMNO; where the adjusting, according to the adjustment type information of the first P-GW and the resource information of the P-GW corresponding to the PMNO and based on that the sum of throughput upper limits of P-GWs corresponding to the PMNO is equal to the total throughput value of the PMNO, the throughput upper limit configured for the first P-GW and the throughput upper limit configured for the another P-GW corresponding to the PMNO specifically includes:

when determining, according to the resource information of all the P-GWs corresponding to the PMNO, that a used throughput value in all the P-GWs corresponding to the PMNO is not greater than a fourth preset value, according to the adjustment type information of the first P-GW and the resource information of all the P-GWs corresponding to the PMNO, increasing the throughput upper limit configured for the first P-GW, and correspondingly decreasing the throughput upper limit in the another P-GW.

Preferably, the program 1132 may further include: the increasing the throughput upper limit configured for the first P-GW includes: increasing a preset throughput value to the throughput upper limit configured for the first P-GW; or when the re-allocation request includes a total throughput value required by the first P-GW, increasing, according to the total throughput value required by the first P-GW, the throughput upper limit in the first P-GW to the total throughput value required by the first P-GW, where the total throughput value required by the first P-GW is obtained by the first P-GW in advance by means of estimation.

Preferably, the program 1132 may further include: when the adjustment type information of the first P-GW is decreasing the throughput upper limit in the first P-GW, the adjusting, according to the adjustment type information of the first P-GW and the resource information of the P-GW corresponding to the PMNO and based on that the sum of throughput upper limits of P-GWs corresponding to the PMNO is equal to the total throughput value of the PMNO, the throughput upper limit configured for the first P-GW and the throughput upper limit configured for the another P-GW corresponding to the PMNO includes:

decreasing the throughput upper limit configured for the first P-GW, ensuring that a throughput upper limit in the first P-GW after the throughput upper limit is decreased satisfies the throughput required by the first P-GW, and correspondingly increasing the throughput upper limit configured for the another P-GW.

Preferably, the program 1132 may further include: the decreasing the throughput upper limit configured for the first P-GW includes: decreasing a preset throughput value to the throughput upper limit configured for the first P-GW; or decreasing the throughput upper limit in the first P-GW to the used throughput value in the first P-GW according to the used throughput value in the first P-GW.

Preferably, the program 1132 may further include: the decreasing the throughput upper limit configured for the first P-GW includes: decreasing, according to a change history record of the throughput upper limit configured for the first P-GW, the throughput upper limit configured for the first P-GW to an original preset value of the throughput upper limit configured for the first P-GW.

Preferably, the program 1132 may further include: before the decreasing the throughput upper limit configured for the first P-GW to an original preset value of the throughput upper limit configured for the first P-GW, the method further includes:

determining, according to the change history record of the throughput upper limit in the first P-GW, whether the original preset value of the throughput upper limit in the first P-GW is not less than the used throughput value in the first P-GW; and when determining that the original preset value of the throughput upper limit in the first P-GW is not less than the used throughput value in the first P-GW, decreasing the throughput upper limit configured for the first P-GW to the original preset value of the throughput upper limit configured for the first P-GW.

For specific implementation of modules in the program 1132, refer to corresponding modules in embodiments shown in FIG. 6 to FIG. 9, and details are not described herein.

Figure 11:
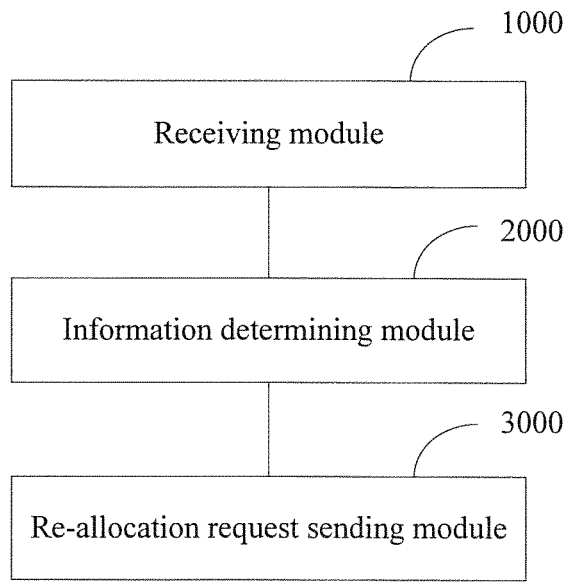
FIG. 11 is even yet another schematic structural diagram of an apparatus for dynamic resource adjustment based on network sharing according to the present invention.

On the basis of the foregoing embodiment, the present invention further provides an apparatus for dynamic resource adjustment based on network sharing. Referring to FIG. 11, FIG. 11 shows even yet another schematic structural diagram of an apparatus for dynamic resource adjustment based on network sharing according to the present invention. The apparatus includes: a receiving module 1000, an information determining module 2000, and a re-allocation request sending module 3000.

The receiving module 1000 is configured to receive an IP-CAN session modification request.

The IP-CAN session modification request includes a request for increasing a throughput upper limit in a first P-GW, a request for decreasing a throughput upper limit in a first P-GW, and a request for not changing a throughput upper limit in a first P-GW. The request for increasing the throughput upper limit in the first P-GW includes any one of a dedicated bearer setup request, a dedicated bearer activation request, or a dedicated bearer update request. The request for decreasing the throughput upper limit in the first P-GW includes a dedicated bearer deletion request or a dedicated bearer update request. The request for not changing the throughput upper limit in the first P-GW includes a dedicated bearer update request.

Specifically, that the receiving module 1000 receives an IP-CAN session modification request may specifically include: the receiving module 2000 receives an IP-CAN session modification request sent by user equipment UE, a mobility management entity MME, or a policy and charging rules function PCRF.

The information determining module 2000 is configured to determine adjustment type information of the first P-GW when determining, according to the IP-CAN session modification request received by the receiving module 1000, that the IP-CAN session modification request causes a change in a total throughput value that is of a PMNO corresponding to the first P-GW and is in the first P-GW, and that a total throughput value in the first P-GW satisfies a preset condition.

The total throughput value in the first P-GW refers to a currently used throughput value in the first P-GW.

In this embodiment, after the receiving module 1000 receives the IP-CAN session modification request, the information determining module 2000 first determines that the IP-CAN session modification request causes a change in the total throughput value that is of the PMNO corresponding to the first P-GW and is in the first P-GW. Specifically, when the IP-CAN session modification request is the request for increasing the throughput upper limit in the first P-GW, after receiving the request, the receiving module 1000 gradually increases the currently used throughput value in the first P-GW, and in this case, the information determining module 2000 determines that the total throughput value that is of the PMNO corresponding to the first P-GW and is in the first P-GW changes. When the IP-CAN session modification request is the request for decreasing the throughput upper limit in the first P-GW, after receiving the request, the receiving module 1000 gradually decreases the currently used throughput value in the first P-GW, and in this case, the information determining module 2000 determines that the total throughput value that is of the PMNO corresponding to the first P-GW and is in the first P-GW changes.

In this embodiment, the preset condition may include whether the used throughput value in the first P-GW is greater than a first preset threshold, or whether the used throughput value in the first P-GW is less than a second preset threshold. The first preset threshold and the second preset threshold are used to indicate a current resource use state of the first P-GW. For example, when a throughput upper limit configured for the first P-GW is 100, the first preset threshold may be 90, and when the used throughput value in the first P-GW is greater than the first preset threshold 90, it indicates that the first P-GW is currently in an almost saturated state, and has few remaining throughputs. The second preset threshold may be 10, and when the used throughput value in the first P-GW is less than the second preset threshold 10, it indicates that the first P-GW is in an idle state, and has many remaining throughputs. Therefore, when the receiving module 1000 receives the IP-CAN session modification request for increasing the throughput upper limit in the first P-GW, and the used throughput value in the first P-GW is greater than the first preset threshold, the information determining module 2000 determines that the first P-GW satisfies the preset condition. Alternatively, when the receiving module 1000 receives the IP-CAN session modification request for decreasing the throughput upper limit in the first P-GW, and the used throughput value in the first P-GW is less than the second preset threshold, the information determining module 2000 determines that the first P-GW satisfies the preset condition.

In addition, the information determining module 2000 is specifically configured to: when the IP-CAN session modification request is the request for increasing the throughput upper limit in the first P-GW, determine that the adjustment type information of the first P-GW is increasing the throughput upper limit in the first P-GW; or the IP-CAN session modification request is the request for decreasing the throughput upper limit in the first P-GW, determine that the adjustment type information of the first P-GW is decreasing the throughput upper limit in the first P-GW.

The re-allocation request sending module 3000 is configured to initiate, to a management network element, a re-allocation request that includes the adjustment type information of the first P-GW and an identity of the PMNO corresponding to the first P-GW, so that after receiving the re-allocation request, the management network element adjusts, according to the re-allocation request, a throughput upper limit configured for the first P-GW and a throughput upper limit configured for another P-GW corresponding to the PMNO, so as to satisfy a throughput required by the first P-GW.

Specifically, in this embodiment, when the management network element receives the re-allocation request that is initiated by the first P-GW and that includes the adjustment type information of the first P-GW and the identity of the PMNO corresponding to the first P-GW, the management network element determines that the first P-GW is to be re-allocated; obtains, according to the identity that is of the PMNO and is in the re-allocation request and a correspondence that is between the identity of the PMNO and a P-GW and is stored in the management network element, resource information of a P-GW corresponding to the PMNO; and further adjusts, according to the adjustment type information of the first P-GW and the resource information of the P-GW corresponding to the PMNO and based on that a sum of throughput upper limits of P-GWs corresponding to the PMNO is equal to the total throughput value of the PMNO, the throughput upper limit configured for the first P-GW and the throughput upper limit configured for the another P-GW corresponding to the PMNO, so as to satisfy the throughput required by the first P-GW.

In this embodiment, the management network element may include a policy and charging rules function PCRF or a service platform Service Platform.

Figure 12:
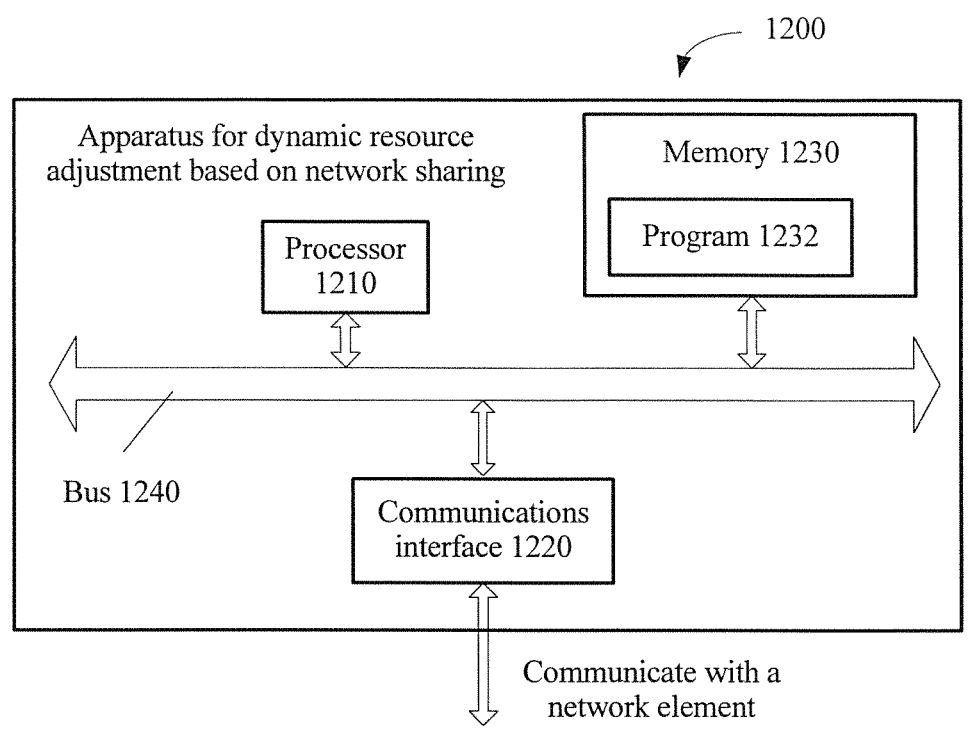
FIG. 12 is even yet another schematic structural diagram of an apparatus for dynamic resource adjustment based on network sharing according to the present invention.

FIG. 12 is even yet another schematic structural diagram of an apparatus for dynamic resource adjustment based on network sharing according to the present invention. As shown in FIG. 12, an apparatus 1200 for dynamic resource adjustment based on network sharing includes:

a processor (processor) 1210, a communications interface (Communications Interface) 1220, a memory (memory) 1230, and a bus 1240.

The processor 1210, the communications interface 1220, and the memory 1230 complete communication with each other by using the bus 1240.

The processor 1210 is configured to execute a program 1232.

Specifically, the program 1232 may include program code, where the program code includes a computer operation instruction.

The processor 1210 may be a central processing unit CPU, or an application-specific integrated circuit ASIC (Application Specific Integrated Circuit), or one or more integrated circuits configured to implement this embodiment of this application.

The memory 1230 is configured to store the program 1232. The memory 1230 may include a high-speed RAM memory, and may further include a non-volatile memory (non-volatile memory), such as at least one disk memory. The program 1232 may specifically include: receiving an IP-connectivity access network IP-CAN session modification request;

determining adjustment type information of the first P-GW when determining, according to the IP-CAN session modification request, that the IP-CAN session modification request causes a change in a total throughput value that is of a PMNO corresponding to the first P-GW and is in the first P-GW, and that a total throughput value in the first P-GW satisfies a preset condition; and initiating, to a management network element, a re-allocation request that includes the adjustment type information of the first P-GW and an identity of the PMNO corresponding to the first P-GW, so that after receiving the re-allocation request, the management network element adjusts, according to the re-allocation request, a throughput upper limit configured for the first P-GW and a throughput upper limit configured for another P-GW corresponding to the PMNO, so as to satisfy a throughput required by the first P-GW.

Preferably, the program 1232 may further include: the determining, according to the IP-CAN session modification request, that the IP-CAN session modification request causes a change in a total throughput value that is of a PMNO corresponding to the first P-GW and is in the first P-GW, and that a total throughput value in the first P-GW satisfies a preset condition includes:

when the IP-CAN session modification request is a request for increasing the throughput upper limit in the first P-GW, and a used throughput value in the first P-GW is greater than a first preset threshold, determining that the first P-GW satisfies the preset condition; or when the IP-CAN session modification request is a request for decreasing the throughput upper limit in the first P-GW, and a used throughput value in the first P-GW is less than a second preset threshold, determining that the first P-GW satisfies the preset condition.

Preferably, the program 1232 may further include: the request for increasing the throughput upper limit in the first P-GW includes any one of a dedicated bearer setup request, a dedicated bearer activation request, or a dedicated bearer update request; and the request for decreasing the throughput upper limit in the first P-GW includes a dedicated bearer deletion request or a dedicated bearer update request.

Preferably, the program 1232 may further include: the determining adjustment type information of the first P-GW includes:

when the IP-CAN session modification request is a request for increasing the throughput upper limit in the first P-GW, determining that the adjustment type information of the first P-GW is increasing the throughput upper limit in the first P-GW; or when the IP-CAN session modification request is a request for decreasing the throughput upper limit in the first P-GW, determining that the adjustment type information of the first P-GW is decreasing the throughput upper limit in the first P-GW.

Preferably, the program 1232 may further include: the receiving an IP-CAN session modification request specifically includes: receiving an IP-CAN session modification request sent by user equipment UE, a mobility management entity MME, or a policy and charging rules function PCRF.

For specific implementation of modules in the program 1232, refer to corresponding modules in an embodiment shown in FIG. 12, and details are not described herein.

The embodiments in this specification are all described in a progressive manner, for same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method.

A person skilled in the art may further be aware that, in combination with the examples described in the embodiments disclosed in this specification, units and algorithm steps may be implemented by electronic hardware or a combination of computer software and electronic hardware. To clearly describe the interchangeability between the hardware and the software, the foregoing has generally described compositions and steps of each example according to functions. Whether the functions are performed by hardware or software and hardware depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The embodiments disclosed above are described to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but extends to the widest scope that complies with the principles and novelty disclosed in this specification.

What is claimed is:

1. A method for dynamic resource adjustment based on network sharing, the method comprising:
    determining, by a management network element, a first packet data network gateway (P-GW) to be re-allocated and adjustment type information of the first P-GW, and obtaining an identity of a participant mobile network operator (PMNO) corresponding to the first P-GW;
    obtaining, by the management network element according to the obtained identity of the PMNO and a stored correspondence between an identity of a PMNO and a P-GW, resource information of a P-GW corresponding to the PMNO; and
    adjusting, by the management network element according to the adjustment type information of the first P-GW and the resource information of the P-GW corresponding to the PMNO, and based on a condition that a sum of throughput upper limits of P-GWs corresponding to the PMNO is equal to a total throughput value of the PMNO, a throughput upper limit configured for the first P-GW and a throughput upper limit configured for another P-GW corresponding to the PMNO, so as to satisfy a throughput required by the first P-GW.

2. The method according to claim 1, wherein determining, by the management network element, the first P-GW to be re-allocated and adjustment type information of the first P-GW, and obtaining the identity of the PMNO corresponding to the first P-GW comprises:
    receiving, by the management network element, a re-allocation request sent by the first P-GW, and determining that the first P-GW is to be re-allocated; and
    determining, by the management network element, the adjustment type information of the first P-GW and the identity of the PMNO according to the adjustment type information of the first P-GW and the identity of the PMNO corresponding to the first P-GW, wherein the adjustment type information and the identity are carried in the re-allocation request.

3. The method according to claim 1, wherein determining, by the management network element, the first P-GW to be re-allocated and adjustment type information of the first P-GW, and obtaining the identity of the PMNO corresponding to the first P-GW comprises:
    determining, by the management network element when determining that the first P-GW satisfies a preset condition, that the first P-GW is to be re-allocated, and determining the adjustment type information of the first P-GW; and
    obtaining, by the management network element according to the stored correspondence between an identity of a PMNO and a P-GW, the identity of the PMNO corresponding to the first P-GW.

4. The method according to claim 1, wherein when the adjustment type information of the first P-GW is increasing the throughput upper limit in the first P-GW, obtaining the resource information of the P-GW corresponding to the PMNO comprises:
    obtaining, by the management network element according to the obtained identity of the PMNO, the resource information of the P-GW corresponding to the PMNO; and
    when determining, according to the obtained resource information of the P-GW, that a remaining throughput value in at least one P-GW is not less than a preset value, adjusting, according to the adjustment type information of the first P-GW and the resource information of the P-GW corresponding to the PMNO and based on the condition that the sum of throughput upper limits of P-GWs corresponding to the PMNO is equal to the total throughput value of the PMNO, the throughput upper limit configured for the first P-GW and the throughput upper limit configured for the another P-GW corresponding to the PMNO;
    wherein adjusting the throughput upper limit configured for the first P-GW and the throughput upper limit configured for the another P-GW corresponding to the PMNO comprises:
        according to the adjustment type information of the first P-GW and resource information of the at least one P-GW, increasing, by the management network element, the throughput upper limit configured for the first P-GW, and correspondingly decreasing a throughput upper limit in the at least one P-GW.

5. The method according to claim 1, wherein when the adjustment type information of the first P-GW is increasing the throughput upper limit in the first P-GW, obtaining the resource information of a P-GW corresponding to the PMNO comprises:
    obtaining, by the management network element according to the obtained identity of the PMNO, resource information of all the P-GWs corresponding to the PMNO;
    wherein adjusting the throughput upper limit configured for the first P-GW and the throughput upper limit configured for the another P-GW corresponding to the PMNO comprises:
        when determining, according to the resource information of all the P-GWs corresponding to the PMNO, that a used throughput value in all the P-GWs corresponding to the PMNO is not greater than a second preset value, according to the adjustment type information of the first P-GW and the resource information of all the P-GWs corresponding to the PMNO, increasing, by the management network element, the throughput upper limit configured for the first P-GW, and correspondingly decreasing the throughput upper limit in the another P-GW.

6. The method according to claim 1, wherein when the adjustment type information of the first P-GW is decreasing the throughput upper limit in the first P-GW, adjusting the throughput upper limit configured for the first P-GW and the throughput upper limit configured for another P-GW corresponding to the PMNO comprises:
  decreasing, by the management network element, the throughput upper limit configured for the first P-GW, wherein a throughput upper limit in the first P-GW after the throughput upper limit is decreased satisfies the throughput required by the first P-GW, and correspondingly increasing the throughput upper limit configured for the another P-GW.

7. A method for dynamic resource adjustment based on network sharing, the method comprising:
  receiving, by a first packet data network gateway (P-GW), an IP-connectivity access network (IP-CAN) session modification request;
  determining adjustment type information of the first P-GW when the first P-GW determines, according to the IP-CAN session modification request, that the IP-CAN session modification request causes a change in a total throughput value that is of a participant mobile network operator (PMNO) corresponding to the first P-GW and is in the first P-GW, and that a total throughput value in the first P-GW satisfies a preset condition; and
  initiating, by the first P-GW to a management network element, a re-allocation request that comprises the adjustment type information of the first P-GW and an identity of the PMNO corresponding to the first P-GW, so that after receiving the re-allocation request, the management network element adjusts, according to the re-allocation request, a throughput upper limit configured for the first P-GW and a throughput upper limit configured for another P-GW corresponding to the PMNO, so as to satisfy a throughput required by the first P-GW.

8. The method according to claim 7, wherein determining, by the first P-GW according to the IP-CAN session modification request, that the IP-CAN session modification request causes a change in a total throughput value that is of a PMNO corresponding to the first P-GW and is in the first P-GW, and that a total throughput value in the first P-GW satisfies a preset condition comprises:
  when the IP-CAN session modification request is a request for increasing the throughput upper limit in the first P-GW, and a used throughput value in the first P-GW is greater than a first preset threshold, determining that the first P-GW satisfies the preset condition; or
  when the IP-CAN session modification request is a request for decreasing the throughput upper limit in the first P-GW, and a used throughput value in the first P-GW is less than a second preset threshold, determining that the first P-GW satisfies the preset condition.

9. The method according to claim 7, wherein determining the adjustment type information of the first P-GW comprises:
  when the IP-CAN session modification request is a request for increasing the throughput upper limit in the first P-GW, determining that the adjustment type information of the first P-GW is increasing the throughput upper limit in the first P-GW; or
  when the IP-CAN session modification request is a request for decreasing the throughput upper limit in the first P-GW, determining that the adjustment type information of the first P-GW is decreasing the throughput upper limit in the first P-GW.

10. The method according to claim 7, wherein receiving, by the first P-GW, the IP-CAN session modification request comprises:
  receiving, by the first P-GW, an IP-CAN session modification request sent by user equipment (UE), a mobility management entity (MME), or a policy and charging rules function (PCRF).

11. An apparatus for dynamic resource adjustment based on network sharing, comprising:
  a processor;
  memory coupled to the processor, the memory comprising instructions that, when executed by the processor, cause the apparatus to:
    determine a first packet data network gateway (P-GW) to be re-allocated and adjustment type information of the first P-GW;
    obtain an identity of a participant mobile network operator (PMNO) corresponding to the first P-GW;
    obtain, according to the identity of the PMNO and a stored correspondence between an identity of a PMNO and a P-GW, resource information of a P-GW corresponding to the PMNO; and
    adjust, according to the adjustment type information of the first P-GW and the resource information of the P-GW corresponding to the PMNO, and based on a condition that a sum of throughput upper limits of P-GWs corresponding to the PMNO is equal to a total throughput value of the PMNO, a throughput upper limit configured for the first P-GW and a throughput upper limit configured for another P-GW corresponding to the PMNO, so as to satisfy a throughput required by the first P-GW.

12. The apparatus according to claim 11, wherein the memory further comprises instructions that, when executed by the processor, cause the apparatus to:
  receive a re-allocation request sent by the first P-GW;
    when the re-allocation request is received, determine that the first P-GW is to be re-allocated; and
    determine the adjustment type information of the first P-GW and the identity of the PMNO according to the adjustment type information of the first P-GW and the identity of the PMNO corresponding to the first P-GW, wherein the adjustment type information and the identity are carried in the re-allocation request.

13. The apparatus according to claim 11, wherein the memory further comprises instructions that, when executed by the processor, cause the apparatus to:
  determine whether the first P-GW satisfies a preset condition; and
  when the first P-GW satisfies the preset condition:
    determine that the first P-GW is to be re-allocated;
    determine the adjustment type information of the first P-GW; and
    obtain, according to the stored correspondence between the identity of the PMNO and the P-GW, the identity of the PMNO corresponding to the first P-GW.

14. The apparatus according to claim 11, wherein the memory further comprises instructions that, when executed by the processor, cause the apparatus to:
  when the adjustment type information of the first P-GW is increasing the throughput upper limit in the first P-GW, obtain, according to the identity of the PMNO, the resource information of the P-GW corresponding to the PMNO;
  determine, according to the resource information, that a remaining throughput value in at least one P-GW is not less than a preset value; and
  according to the adjustment type information of the first P-GW and resource information of the at least one P-GW, increase the throughput upper limit configured for the first P-GW, and correspondingly decrease a throughput upper limit in the at least one P-GW.

15. The apparatus according to claim 11, wherein the memory further comprises instructions that, when executed by the processor, cause the apparatus to:
when the adjustment type information of the first P-GW is increasing the throughput upper limit in the first P-GW, obtain, according to the identity of the PMNO, resource information of all the P-GWs corresponding to the PMNO; and
determine, according to the resource information that is of all the P-GWs corresponding to the PMNO, that a used throughput value in all the P-GWs corresponding to the PMNO is not greater than a second preset value; and
according to the adjustment type information of the first P-GW and the resource information of all the P-GWs corresponding to the PMNO, increase the throughput upper limit configured for the first P-GW, and correspondingly decrease the throughput upper limit in the another P-GW.

16. The apparatus according to claim 11, wherein the memory further comprises instructions that, when executed by the processor, cause the apparatus to:
when the adjustment type information of the first P-GW is decreasing the throughput upper limit in the first P-GW, decrease the throughput upper limit configured for the first P-GW, wherein a throughput upper limit in the first P-GW after the throughput upper limit is decreased satisfies the throughput required by the first P-GW, and correspondingly increase the throughput upper limit configured for the another P-GW.

17. An apparatus for dynamic resource adjustment based on network sharing, the apparatus comprising:
a processor;
memory coupled to the processor, the memory comprising instructions that, when executed by the processor, cause the apparatus to:
receive an IP-connectivity access network (IP-CAN) session modification request;
determine adjustment type information of a first packet data network gateway (P-GW) when determining, according to the received IP-CAN session modification request, that the IP-CAN session modification request causes a change in a total throughput value of a participant mobile network operator (PMNO) corresponding to the first P-GW and is in the first P-GW, and that a total throughput value in the first P-GW satisfies a preset condition; and
initiate, to a management network element, a re-allocation request that comprises the adjustment type information of the first P-GW and an identity of the PMNO corresponding to the first P-GW, so that after receiving the re-allocation request, the management network element adjusts, according to the re-allocation request, a throughput upper limit configured for the first P-GW and a throughput upper limit configured for another P-GW corresponding to the PMNO, so as to satisfy a throughput required by the first P-GW.

18. The apparatus according to claim 17, wherein the memory further comprises instructions that, when executed by the processor, cause the apparatus to:
when the IP-CAN session modification request is a request for increasing the throughput upper limit in the first P-GW, and a used throughput value in the first P-GW is greater than a first preset threshold, determine that the first P-GW satisfies the preset condition; or
when the IP-CAN session modification request is a request for decreasing the throughput upper limit in the first P-GW, and a used throughput value in the first P-GW is less than a second preset threshold, determine that the first P-GW satisfies the preset condition.

19. The apparatus according to claim 17, wherein the memory further comprises instructions that, when executed by the processor, cause the apparatus to:
when the IP-CAN session modification request is a request for increasing the throughput upper limit in the first P-GW, determine that the adjustment type information of the first P-GW is increasing the throughput upper limit in the first P-GW; or
when the IP-CAN session modification request is a request for decreasing the throughput upper limit in the first P-GW, determine that the adjustment type information of the first P-GW is decreasing the throughput upper limit in the first P-GW.

20. The apparatus according to claim 17, wherein the memory further comprises instructions that, when executed by the processor, cause the apparatus to:
receive an IP-CAN session modification request sent by user equipment (UE), a mobility management entity (MME), or a policy and charging rules function (PCRF).

* * * * *